United States Patent
Kojchev et al.

(10) Patent No.: US 12,530,966 B2
(45) Date of Patent: Jan. 20, 2026

(54) EFFICIENT TRAJECTORY PLANNING FOR A FLEET OF VEHICLES

(71) Applicant: Volvo Autonomous Solutions AB, Gothenburg (SE)

(72) Inventors: Stefan Kojchev, Mölndal (SE); Robert Hult, Torslanda (SE); Maximilian Kneissl, Gothenburg (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 105 days.

(21) Appl. No.: 18/646,140

(22) Filed: Apr. 25, 2024

(65) Prior Publication Data
US 2024/0371268 A1    Nov. 7, 2024

(30) Foreign Application Priority Data

May 3, 2023   (EP) ..................................... 23171302

(51) Int. Cl.
*G08G 1/0967*    (2006.01)

(52) U.S. Cl.
CPC .............................. *G08G 1/096766* (2013.01)

(58) Field of Classification Search
CPC ......... G08G 1/096766; G05D 2107/70; G05D 1/644; G05D 1/6987; G05D 1/693; G05D 2105/20; G05D 2109/10
See application file for complete search history.

(56) References Cited

U.S. PATENT DOCUMENTS 7,280,993 B2 * 10/2007 Jain ..................... G06F 30/3323
                                                                706/45
9,940,840 B1    4/2018 Schubert et al.
(Continued)

FOREIGN PATENT DOCUMENTS

| | | |
|---|---|---|
| CN | 114187781 A | 3/2022 |
| CN | 115578880 A | 1/2023 |
| WO | 202240748 A1 | 3/2022 |

OTHER PUBLICATIONS

Extended European Search Report in corresponding European Application No. 23171302.5 dated Jan. 26, 2024 (9 pages).
(Continued)

*Primary Examiner* — Bhavesh V Amin
(74) *Attorney, Agent, or Firm* — Jeffri A. Kaminski; Venable LLP

(57) ABSTRACT

A method of planning trajectories for vehicles operating in a common environment, wherein movements of each vehicle are controllable by a control signal is provided the method includes for each vehicle, obtaining a predefined vehicle path to be traversed; performing a first computation to obtain a vehicle crossing order $\hat{O}$ at each mutually exclusive—MUTEX—zone between two vehicle paths, wherein the first computation is subject to safety constraints; and performing trajectory planning subject to the obtained vehicle crossing order at the MUTEX zones, to obtain a control signal for each of the vehicles. The method further includes assigning a dependency metric to each pair of vehicles, and partitioning the vehicles into a number $N_{SG}$ of vehicle subsets such that the dependency metric exceeds a threshold within each, wherein the trajectory planning is performed as multiple independent subproblems, each relating to one of the vehicle subsets.

21 Claims, 13 Drawing Sheets

(56) References Cited

U.S. PATENT DOCUMENTS

| | | | | |
|---|---|---|---|---|
| 10,860,023 | B2* | 12/2020 | Di Cairano | B60W 30/0956 |
| 11,584,389 | B2* | 2/2023 | Gogna | G05D 1/0212 |
| 11,775,703 | B2* | 10/2023 | Mirzendehdel | G06Q 10/043 |
| | | | | 703/7 |
| 12,397,431 | B2* | 8/2025 | Pan | B25J 9/1666 |
| 2004/0098682 | A1* | 5/2004 | Jain | G06F 30/3323 |
| | | | | 716/103 |
| 2009/0192981 | A1* | 7/2009 | Papaemmanouil | |
| | | | | G06F 16/2471 |
| 2013/0219362 | A1* | 8/2013 | Cai | G06N 5/00 |
| | | | | 717/123 |
| 2019/0391580 | A1* | 12/2019 | Di Cairano | G08G 1/165 |
| 2021/0323573 | A1* | 10/2021 | Gogna | G01C 21/3407 |
| 2023/0159054 | A1* | 5/2023 | Jespersen | B60W 60/0013 |
| | | | | 701/23 |
| 2023/0297089 | A1* | 9/2023 | Jin | G05B 19/41885 |
| | | | | 700/97 |
| 2024/0238977 | A1* | 7/2024 | Pan | B25J 9/1666 |
| 2024/0371268 | A1* | 11/2024 | Kojchev | G05D 1/693 |
| 2025/0269856 | A1* | 8/2025 | Gesang | B60W 30/1882 |

OTHER PUBLICATIONS

Stefan Kojchev et al; "Optimization based coordination of autonomous vehicles in confined areas"; 2022 IEEE 25th International Conference on Intelligent Transportation Systems (ITSC); Oct. 8, 2022; pp. 1957-1963; XP34216418A; DOI: 10.1109/ITSC55140.2022.9922180; 7 pages.

Stefan Kojchev et al; "Quadratic approximation based heuristic for optimization-based coordination of automated vehicles in confined areas"; 2022 IEEE 61ST Conference on Decision and Control (CDC); Dec. 6, 2022; pp. 6156-6162; XP34271777A; DOI: 10.1109/CDC51059.2022.9992529; 7 pages.

* cited by examiner

EFFICIENT TRAJECTORY PLANNING FOR A FLEET OF VEHICLES

TECHNICAL FIELD

The disclosure relates generally to the field of automatic vehicle control. In particular aspects, the disclosure relates to techniques for coordinating the movement of multiple vehicles in an environment with mutually exclusive (MUTEX) zones. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Confined sites, such as ports, logistic centers, or mines, are promising targets for the deployment of automated vehicles (AVs) in the near future. Compared to public roads, confined sites offer fewer barriers to AV deployment [1], as they can be designed to remove safety concerns associated with unsupervised actors. One of the public road challenges that do persist in confined areas is the safe and efficient coordination of AVs in MUTually EXclusive (MUTEX) zones. To illustrate, FIG. 12A is a top view of an intersection-type MUTEX zone, FIG. 12B shows a merge-split MUTEX zone, and FIG. 12C shows a MUTEX zone constituted by a narrow road section. For public roads, the coordination of automated vehicles for intersection-type MUTEX zones has received substantial attention recently; see [2] for a comprehensive survey. In confined sites, a number of additional types of MUTEX zones are present, such as loading/unloading locations, charging/fueling stations, and narrow roads.

In general, the coordination problem is difficult to solve and has formally been shown to be NP-hard [3]. This stems from the need of combinatorial decisions in its solution. In particular, for every two vehicles that need access to a MUTEX zone, an order of utilization must be determined. This causes the solution space to grow rapidly in the number of vehicles and MUTEX zones. Commonly proposed approaches leverage optimal control methods, often relying on simplifying assumptions and heuristics, to compute the coordinated vehicle trajectories; see [4], [5], [6].

In their previous work [7] (see also patent application EP22195954.7), the inventors proposed a heuristic that decomposes the coordination problem in a Mixed Integer Quadratic Program (MIQP) that is solved for the optimal MUTEX utilization order and a continuous Nonlinear Program (NLP) that is solved for the optimal vehicle trajectories. The approach provides a high-level motion plan from the start to the end of each vehicle's transport mission. When a general-purpose solver is used, the complexity of the NLP scales cubically with the number of vehicles and the length of each vehicle's transport mission. As the problems optimize many vehicles over long horizons, the NLP becomes the predominant component in the computational complexity of the proposed heuristic for most realistic problem instances.

The total computational effort remains significant in the realistic use cases.

SUMMARY

One objective of the present disclosure is to make available vehicle fleet coordination techniques which are computationally more efficient than the currently available methods reviewed above and/or which lend themselves to convenient implementation. A further objective is to ensure scalability (with respect to the number of vehicles) of the described computation while safeguarding the provision of efficient and safe instructions for the vehicle fleet.

According to a first aspect of the present disclosure, there is proposed a method of planning trajectories for a plurality of vehicles operating in a common environment, wherein movements of each vehicle are controllable by a control signal. The method comprises: for each vehicle, obtaining a predefined vehicle path to be traversed; performing a first computation to obtain a vehicle crossing order 6 at each mutually exclusive (MUTEX) zone between two vehicle paths, wherein the first computation is subject to safety constraints; and performing trajectory planning subject to the obtained vehicle crossing order at the MUTEX zones, to obtain a control signal for each of the vehicles. According to the first aspect, the method further comprises assigning a dependency metric to each pair of vehicles, and partitioning the vehicles into a number $N_{SG}$ of vehicle subsets (in particular, $N_{SG}$ disjoint vehicle subsets) such that the dependency metric exceeds a threshold $\eta$ within each. Then, the trajectory planning is performed as multiple independent subproblems, each relating to one of the vehicle subsets.

As a technical benefit, the method according to the first aspect may allow an original NLP to be decomposed into multiple smaller independent NLPs. The decomposition method may be based on a graph-view of the problem [8], [9], where each vehicle is a node and each mutex relation is an edge. Here, a mutex relation is said to exist between two vehicles when both require utilization of the same MUTEX during some part of their transport mission. Even though a mutex relation exists, it is not necessarily the case that it influences the solution to the NLP. A simple example of this is when two vehicles need to cross an intersection, but where their crossings can be significantly separated in time. This fact is used to find mutex relations, i.e., edges in the graph, which can be removed, and thereafter employ graph-theoretic tools to find a decomposition of the graph into subgraphs when possible. From each sub-graph a separate NLP can be constructed, whose solution coincides with the part of the original NLP's solution that pertains to the involved vehicles. The general high-level idea is illustrated in FIG. 1, where each of the three dashed curves encloses a subset of vehicles for which trajectory planning is performed independently of the other vehicles. As further suggested by FIG. 1, the three independent trajectory planning problems can be executed by separate processing resources.

Optionally in some examples, including in at least one preferred example, the subproblems are solved as optimal control problems (OCPs) for a predefined cost function.

Optionally in some examples, including in at least one preferred example, the first computation is an optimization problem and the dependency metric is derived from the solving of said optimization problem. Alternatively, the first computation may be a distance-based First Come First Served algorithm.

Optionally in some examples, including in at least one preferred example, the dependency metric for a pair of vehicle paths is related to one or more dual optimization variables $\mu_k$ associated with safety constraints for the MUTEX zones between these vehicle paths.

Optionally in some examples, including in at least one preferred example, the method further comprises: forming an adjacency matrix in which the elements correspond to pairs of the vehicles; reducing a nonzero element in the adjacency matrix if a safety constraint for a MUTEX zone between the paths of the corresponding vehicle has an associated dual optimization variable which is less than the threshold $\eta$; and partitioning the vehicles into subsets in accordance with the adjacency matrix after the reductions.

Optionally in some examples, including in at least one preferred example, the dependency metric for a pair of vehicle paths is related to the number of MUTEX zones between these vehicle paths.

Optionally in some examples, including in at least one preferred example, the dependency metric is further related to a dependency importance weight. In particular, the dependency importance weight may represent (an inverse of) a time separation of consecutive vehicles at a MUTEX zone according to the crossing order.

Optionally in some examples, including in at least one preferred example, the partitioning of the vehicles includes: forming a weighted graph where nodes represent vehicles and where edges represent MUTEX zones; and performing a depth-first search to determine subgraphs.

Optionally in some examples, including in at least one preferred example, the method further comprises determining the threshold based on the assigned values of the dependency metric.

Optionally in some examples, including in at least one preferred example, each of the subproblems is independent of the safety constraints of the first computation.

Optionally in some examples, including in at least one preferred example, the first computation is an optimization problem which is solved as a mixed-integer quadratic program (MIQP).

Optionally in some examples, including in at least one preferred example, the MUTEX zones include at least one of the following: an intersection zone, a merge-split zone, a dwelling zone, wherein the safety constraints for an intersection zone or a dwelling zone include a mutual exclusion requirement, and wherein the safety constraints for a merge-split zone include a minimum longitudinal spacing requirement.

Optionally in some examples, including in at least one preferred example, the common environment is a confined area with no other traffic participants than said vehicles.

Optionally in some examples, including in at least one preferred example, the movements of each vehicle are controllable independently of other vehicles. This is to say, although a vehicle may have to respect positions and movements of nearby vehicles to avoid collisions, the position of the vehicle is not locked (or constrained) to that of another vehicle like in platooning.

In a second aspect of the present disclosure, the above method is embedded into a method of controlling a plurality of vehicles operating in a common environment which includes at least one MUTEX zone, wherein movements of each vehicle are controllable by a control signal. The method according to the second aspect comprises: sensing current positions of all vehicles; performing trajectory planning according to the above method, subject to the sensed vehicle positions, to obtain a control signal for each of the vehicles; and feeding the control signals to the vehicles for execution.

Optionally in some examples, including in at least one preferred example, execution of the obtained control signals is subject to a successful verification of the safety constraints of the first computation. In particular, if the verification of the safety constraints of the first computation fails, the vehicles are partitioned into a number $N_{SG}'$ of new vehicle subsets, and the trajectory planning is performed as independent subproblems relating to the new vehicle subsets.

Optionally in some examples, including in at least one preferred example, the solving of the subproblems is delegated (D, E in FIG. 15) to one or more distributed processing resources, such as processing resources carried by the vehicles. The execution of the method, including any delegation, may be coordinated by a central processing resource, which is either fixedly installed or carried by one of the vehicles In a third aspect of the present disclosure, there is proposed a computer system comprising memory and processing circuitry configured to perform the method of the first or second aspect.

This disclosure further relates to a computer program containing instructions for causing a computer system to carry out the above methods. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are now described, by way of example, with reference to the accompanying drawings, on which.

DETAILED DESCRIPTION

Figure 1:
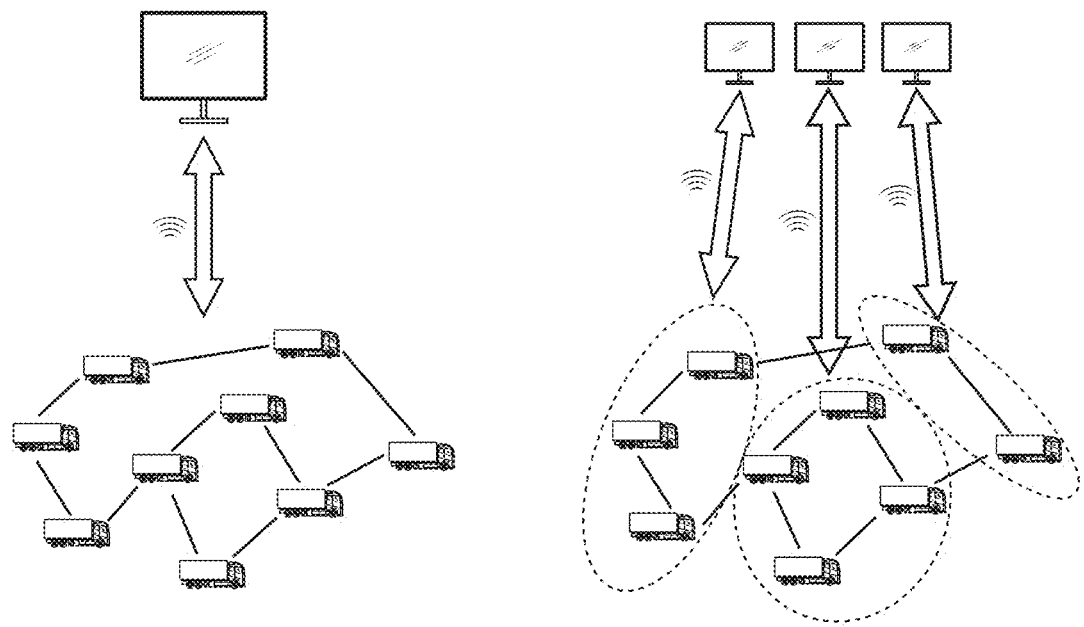
FIG. 1 is a high-level illustration of the approach of finding sub-graphs and computing the sub-graphs problems in parallel.

This disclosure will propose a computational decomposition strategy for the central optimal coordination problem, enabling the computation of multiple NLPs in parallel. The proposed algorithm is based on a graph view of the problem and exploits the heuristic used to solve the coordination problem to refine the graph connections. A tunable metric is proposed to further decompose the graphs. The method in the present disclosure can thus be used to analyze the trade-off between optimality and computation which is linked to the degree of decomposition. Additionally, the optimization-based method in [7] has been extended to handle recomputing the motion plan and the dynamic case when new vehicles are added to the optimization problem. The proposed computational decomposition method is integrated into this algorithm.

Partitioning large graphs is an important subproblem for reducing complexity and enabling parallelization in various applications, such as social networks, power grids, road networks, and communication problems [10], [11], [12]. One widely applicable technique is the hierarchical decomposition approach [13], which decomposes the original problem into multiple layers using slack variables (Lagrange multi-pliers). These approaches are particularly useful for network utility maximization. In a related study [14] the authors propose an approach of finding sub-graphs when the weights of the graph's vertex connections dynamically change. This is an alternative way of interpreting the problem, however, the methods used for finding sub-graphs differ from the proposed approach in this disclosure. The method in [15] also relies on weighted graphs for how to partition airspace into smaller regions, where the weights are calculated based on summing the number of aircraft in each region.

Connecting the vehicles using graphs is commonly used in multi-agent problems [16], [17]. One methodology that leverages graph connections for multi-agent control and conflict avoidance is by using a consensus-based approach [18], [19]. In [20] the authors propose a consensus-based approach that is capable of handling dynamic situations, i.e., when a new vehicle is added and new connections are formed. The consensus-based method however requires that all considered agents be connected, which is not an assumption required by the approach herein. In [21], a decentralized cooperative traffic management approach is proposed, where agents communicate with each other if their distance is less than a fixed alert distance. The alert distance serves as a metric for the decentralization of communication (connection) between agents. The decentralized approach assumes that each agent decides its own behavior based on a policy that optimizes a cost function related only to the agents it is connected to.

In terms of analysis, the benefits of the proposed computational decomposition approach are demonstrated through multiple simulation scenarios, particularly when computing the motion plan initially, recomputing the plan, and when a new vehicle is added to the optimization problem. The proposed approach is compared with the non-decomposed problem which was used in [7] and a simple decomposition based solely on current graph connections.

The detailed description set forth below provides information and examples of the disclosed technology with sufficient detail to enable those skilled in the art to practice the disclosure.

Problem Formulation

Figure 12B:
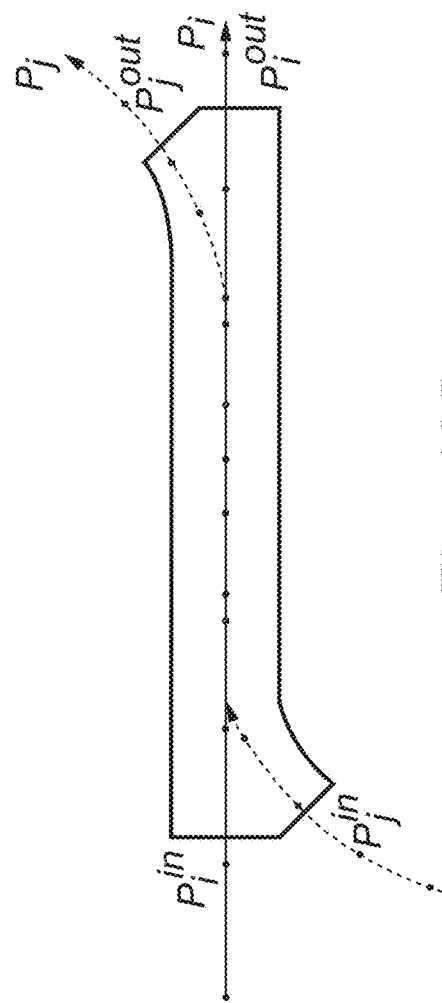
FIG. 12 are top views of different types of MUTEX zones, including an intersection (FIG. 12A), a merge-split zone (FIG. 12B) and a narrow road section (FIG. 12C)
Figure 12C:
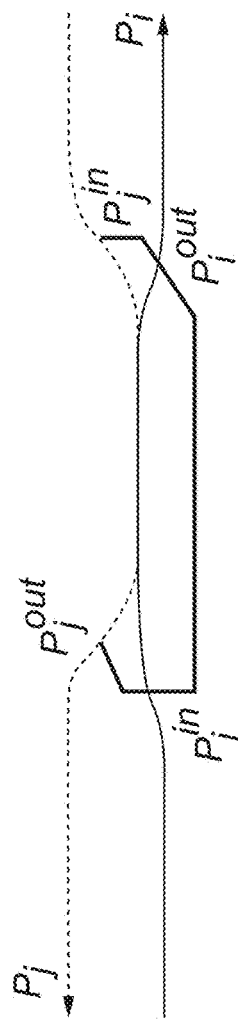
Figure 12A:
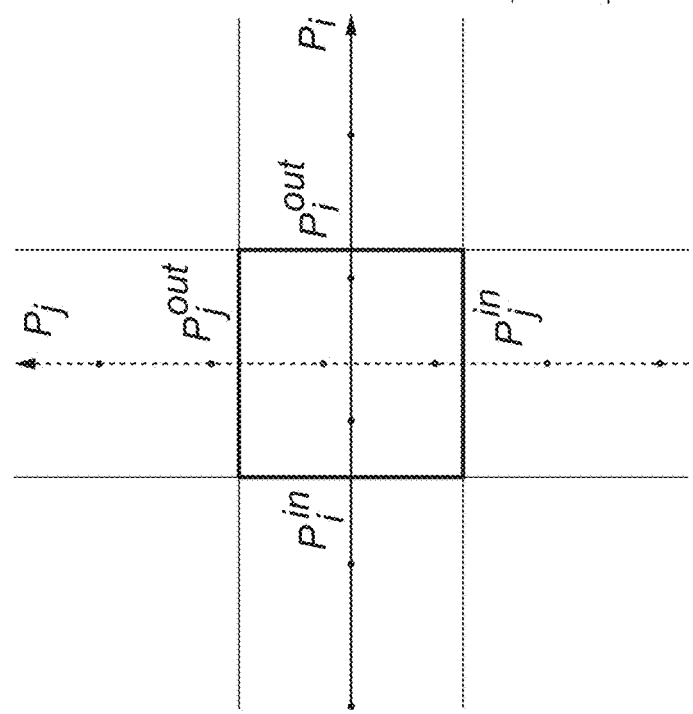

A model used in the theoretical part of this disclosure considers $N_a$ fully automated vehicles operating in a confined area, meaning that non-controlled traffic participants such as pedestrians, manually operated vehicles, bicycles, etc., are absent or can be neglected without detriment. Furthermore, it is assumed that the paths of all vehicles, i.e., their routes through the road network, are known, that overtakes are prohibited, and that no vehicle reverses. The road network contains mutually exclusive (MUTEX) zones, such as intersections, merge-splits, narrow roads, etc., where simultaneous access must be restricted; see FIG. 12. A MUTEX zone may alternatively be referred to as a conflict zone.

Figure 14:
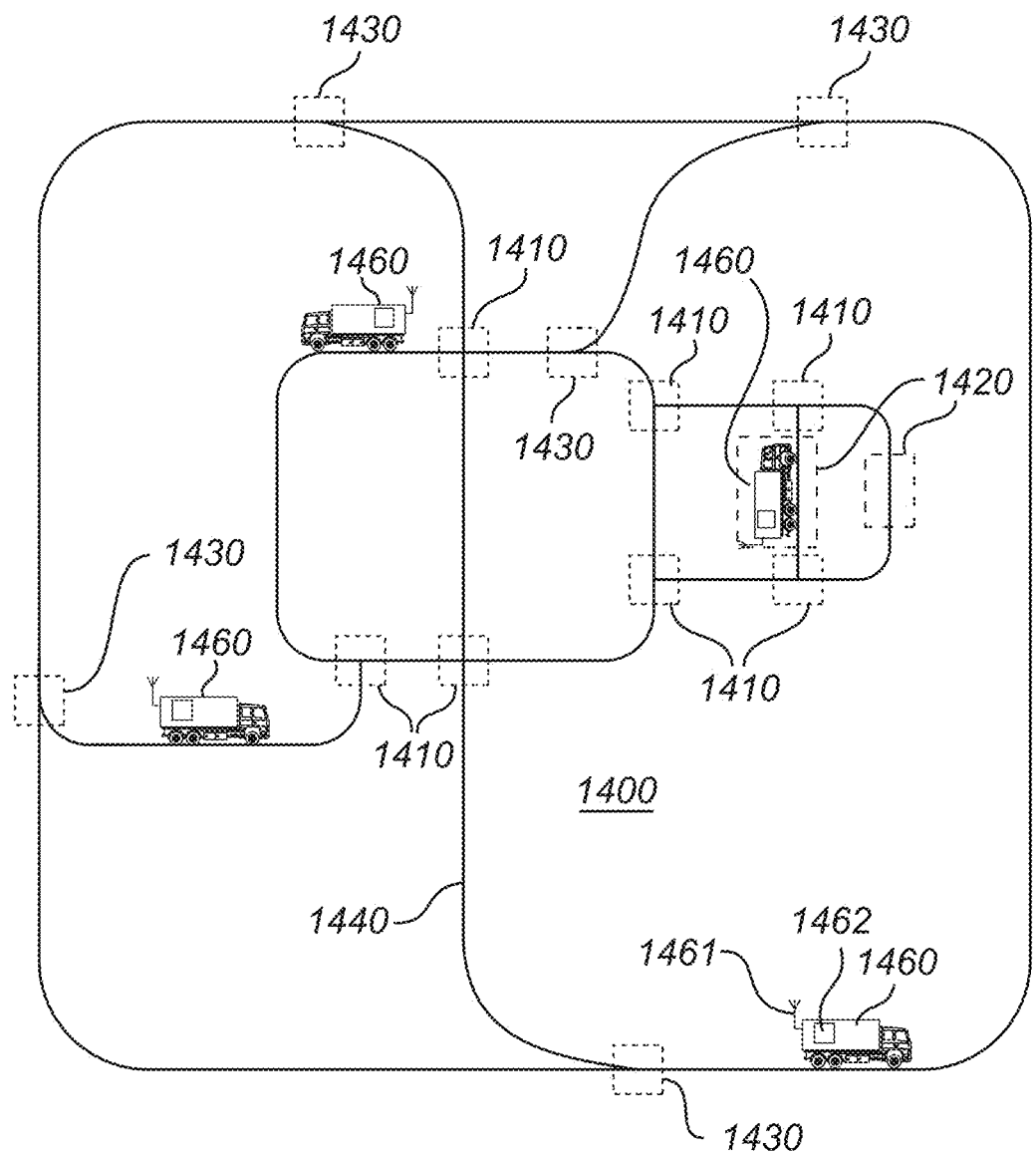
FIG. 14 shows an environment with multiple intersection MUTEX zones, merge-split MUTEX zones and dwelling-type MUTEX zones, in which a plurality of vehicles operates, as well as a device suitable for controlling said vehicles is deployed.
Figure 14:
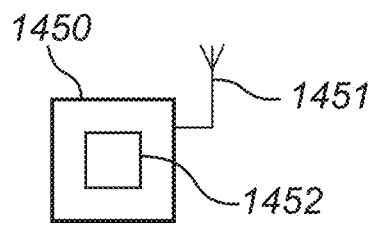

To illustrate, FIG. 14 shows an environment 1400 in which a plurality of vehicles 1460 operate. The environment 1400 includes roads 1440 as well as multiple intersection MUTEX zones 1410, dwelling-type MUTEX zones (dwelling zones) 1420 and merge-split MUTEX zones 1430. The environment 1400 may be a confined area with no other traffic participants than the vehicles 1460. The vehicles 1460 may be conventional vehicles, partially autonomous vehicles or fully autonomous vehicles; they may be cars, trucks, buses, construction equipment; they may be single vehicles or multi-unit vehicle combinations. Also visible in FIG. 14 is a computer system 1450 suitable for controlling said vehicles 1460. The computer system 1450 includes processing circuitry 1452 and is configured to communicate over a wireless interface 1451 with corresponding wireless interfaces 1461 on the vehicles 1460. As indicated for one example vehicle 1460, the vehicles 1460 circulating in the environment 1400 may further include vehicle-carried processing circuitry 1462.

Optimal Coordination Problem

The problem of finding the optimal vehicle trajectories that avoid collision can be stated as:

Problem 1 (Optimal Coordination Problem): Obtain the optimal state and control trajectories $X^*=\{x_1^*, \ldots x_{N_a}^*\}$, $\mathcal{U}^*=\{u_1^*, \ldots u_{N_a}^*\}$, given the initial state $X_0=\{x_{1,0}, \ldots x_{N_a,0}\}$, by solving the optimization problem $$\min_{x_i, u_i, O} \sum_{i=1}^{N_a} J_i(x_i, u_i) \tag{1a}$$

subject to initial states $x_{i,0} = \hat{x}_{i,0}$ (1b)

system dynamics (1c)

state and input constraints (1d)

safety constraints. (1e)

where $J_i(x_i, u_i)$ is a cost function (objective function), $\mathcal{O}$ is the order in which the vehicles enter all MUTEX zones in the site. The cost function depends on state and control trajectories for each vehicle $$x_i = (x_{i,0}, x_{i,1}, \ldots)$$
$$u_i = (u_{i,0}, u_{i,1}, \ldots)$$

where $i=1, \ldots, N_a$. The cost function may be related to a dynamic vehicle model, and it may include cost terms representing the energy consumption, expected wear, expected service needs, etc. incurred by the vehicles' movements and positions. The safety constraints in this problem relate to the collision-free occupancy of the MUTEX zones. The constraints (1b)-(1e) apply for all vehicles, hence, for all values of the index i.

In one example, the OCP can be stated as follows:

$$\min_{\mathcal{W},b} J(\mathcal{W}) \quad (2)$$
$$\text{s.t. } g(\mathcal{W}) = 0$$
$$h(\mathcal{W}) \leq 0$$
$$c(\mathcal{W}, b) \leq 0$$

where $\mathcal{W} = \{X, \mathcal{U}\}$, $J(\mathcal{W}) = \sum_{i=1}^{N_a} J_i(w_i)$, $g(\mathcal{W})$, $h(\mathcal{W})$ gather all equality and inequality constraints, and $c(\mathcal{W},b) = c_w(\mathcal{W}) + Cb$ are the integer constraints for the combinatorial part of the problem with C a matrix that captures the influence of the integer variables. A quadratic approximation of (2) can be provided in a similar fashion as QP sub-problems are formed in SQP methods. In essence, (2) can be reformulated as:

$$\min_{\mathcal{W},b} \frac{1}{2} \begin{bmatrix} \Delta \mathcal{W} \\ b \end{bmatrix}^T H(\mathcal{W}, \lambda, \mu) \begin{bmatrix} \Delta \mathcal{W} \\ b \end{bmatrix} + \nabla_{\mathcal{W}} J(\mathcal{W})^T \begin{bmatrix} \Delta \mathcal{W} \\ b \end{bmatrix} + J(\mathcal{W}^{**}) \quad (3a)$$

$$\text{s.t. } g(\mathcal{W}^{}) + \nabla_{\mathcal{W}} g(\mathcal{W}^{})^T \begin{bmatrix} \Delta \mathcal{W} \\ b \end{bmatrix} = 0 \quad (3b)$$

$$h(\mathcal{W}^{}) + \nabla_{\mathcal{W}} h(\mathcal{W}^{})^T \begin{bmatrix} \Delta \mathcal{W} \\ b \end{bmatrix} \leq 0$$

$$c_w(\mathcal{W}^{}) + \nabla_{\mathcal{W}} c_w(\mathcal{W}^{})^T \begin{bmatrix} \Delta \mathcal{W} \\ b \end{bmatrix} + Cb \leq 0$$

where $$H(\mathcal{W}, \lambda, \mu) = blk\text{diag}(\{H_i\}_{i=1}^{N_a}, 0_{r_0+w_0, r_0+w_0})$$

is a positive-definite block diagonal matrix with $$H_i(w_i, \lambda_i, \mu_i) = \nabla^2_{w_i} \mathcal{L}(w_i, \lambda_i, \mu_i) = \nabla^2_{w_i} J_i(w_i) - \nabla^2_{w_i} \lambda_i^T g(w_i) - \nabla^2_{w_i} \mu_i^T h(w_i),$$

where $\lambda_i$, $\mu_i$ are the dual variables and zeros of appropriate size for the integer variables, and $\Delta \mathcal{W} = \mathcal{W} - \mathcal{W}^{}$, with a solution guess (solution conjecture) $\mathcal{W}^{}$. The constant term $J(\mathcal{W}^{})$ can be discarded. The solution guess $\mathcal{W}^{}$ can be obtained, for example, by solving the optimization problem (1) without safety constraints (1e), or by a forward simulation of the vehicles with, for example, an LQR controller.

Figure 2:
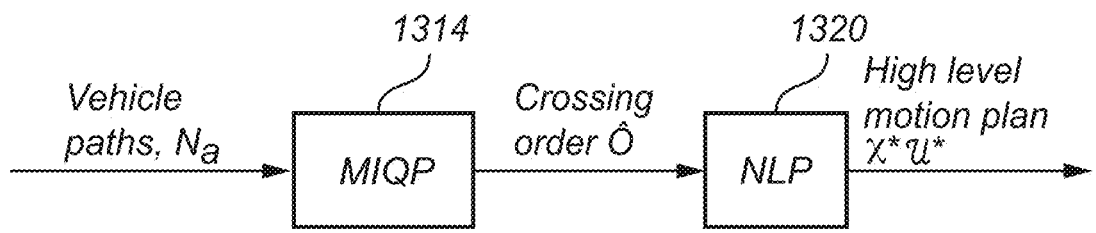
FIG. 2 is a schematic illustration of an optimization-based coordination heuristic.

Problem 1 can be stated as a Mixed Integer Nonlinear Program (MINLP), where the crossing order corresponds to the "integer part" and the state and control trajectories corresponds to the "NLP part". However, finding a solution to MINLP problems is known to be difficult, especially when the constraints or the cost function are non-convex. Therefore, a common procedure is to apply an approach where the integer part of the solution is obtained first using a heuristic, and the continuous part of the solution thereafter is obtained by solving the nonlinear program (NLP) that results from fixing the integers to the values found with the heuristic. The approach presented in approximates the integer part of the solution of (1) by solving a Mixed Integer Quadratic Problem (MIQP) resulting in "approximately optimal" crossing order $\hat{\mathcal{O}}$. The MIQP is formed as a quadratic approximation of (1), similarly to how QP sub-problems are formed in SQP methods [23]. Following the MIQP, a "fixed-order coordination" NLP is solved, i.e., Problem 1 with a fixed crossing order $\mathcal{O} = \hat{\mathcal{O}}$, for obtaining the state and control trajectories. FIG. 2 depicts the control structure of the heuristic. The proposed MIQP has an exponential complexity in the decision variables (i.e., amount of MUTEX zones) and the NLP has a cubic complexity in the number of stages, i.e., the sum of $N_a$ vehicles and M stages per vehicle.

Coordination Graphs

For multi-agent systems, it is common practice to model the relation between the agents by means of graphs. A graph is defined by its vertex $\mathcal{V}$ and edge $\varepsilon$ sets $G=(V,\varepsilon)$. In the context of multi-vehicle coordination, one possibility is to form a graph where the vehicles are the graph's vertices $\mathcal{V} = \{1, \ldots, N_a\}$. The edge set can be defined such that every pair of vehicles that share one or more MUTEX zones have an edge, i.e. $\varepsilon \subset \mathcal{V} \times \mathcal{V}$. This choice would result in undirected graphs.

Figure 3:
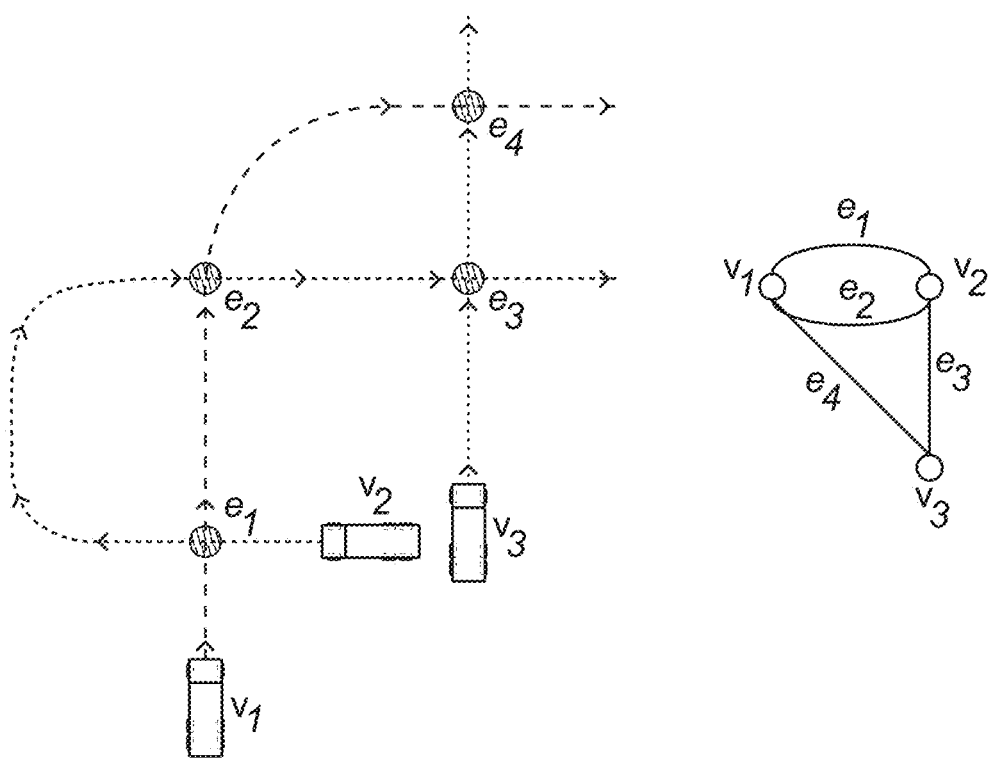
FIG. 3 is an example of a scenario and its associated graph representation.

The left-hand portion of FIG. 3 shows an example of a scenario with three vehicles v1, v2, v3 that have multiple MUTEX zones e1, e2, e3, e4. To the right in FIG. 3, there is a graph representation of the scenario modeled with the above-defined dependencies.

One representation of graphs is through the adjacency matrix. For a graph with vertices $[1, \ldots, N_a]$, its adjacency matrix $A_{adj}$ is the $N_a \times N_a$ matrix whose ij-th entry is the number of edges joining vertex i and vertex j. In the example illustrated in FIG. 3, the adjacency matrix is:

$$A_{adj} = \begin{bmatrix} 0 & 2 & 1 \\ 2 & 0 & 1 \\ 1 & 1 & 0 \end{bmatrix}. \quad (4)$$

Identifying Vehicle Subsets

This section presents a procedure for identifying relevant edges (connections) and sub-graphs for the vehicle coordination problem. Furthermore, it will be described how this procedure can be integrated into the optimization-based heuristic.

Relevant Edges

A critical consideration when constructing coordination graphs, as discussed just above, is whether all edges in the graph are relevant to the problem. In this context, a relevant edge is a MUTEX zone for which the safety constraints will be violated if the vehicles do not modify their state and control trajectories.

The inventors have realized a way to utilize the property of constrained optimization problems that a constraint is not active if the dual variable (or slack variable, or Lagrange multiplier) associated with that constraint is equal to zero. In other words, a non-active constraint does not influence the solution to the problem. Since the MUTEX constraints explicitly enter the optimization problem, and the optimization-based heuristic's MIQP is a direct approximation of the MINLP, it is possible to estimate the influence of the MUTEX constraints before solving the NLP. Thus, it is proposed to use the dual variables of the MIQP to identify unnecessary edges. When an edge is found unnecessary, the adjacency matrix is modified by removing the connection for the vehicles and the MUTEX zone elements related to that edge. Specifically, it is determined which vehicles are connected by the unnecessary zone and the adjacency matrix elements are reduced by one for those vehicles. The dual variables of the MUTEX constraints from the MIQP can be denoted as $\mu_k$, $k=1, \ldots, N_{cz}$, where $N_{cz}$ is the total amount of MUTEX zones in the site.

Remark 1: The MIQP remains an approximation, and there is a risk of erroneously omitting a necessary edge. Therefore, an implementer of the present teachings may choose to perform a safety check on the MUTEX constraints that have been excluded after solving the NLP.

In some cases, a dual variable may not be exactly equal to zero but is "fairly" close to zero. For instance, in long-horizon optimization problems, a relevant MUTEX zone may be located far away from the current vehicle positions. This implies that even though a collision would occur if no control action were taken, the constraint does not significantly influence the optimization problem's solution because the vehicles have substantial control flexibility to take actions that would avoid violating the constraint. Accordingly, a tunable margin $\eta$ (or threshold) is defined, which allows further dropping edges that are just "weakly" relevant, e.g., if $\mu_k \leq \eta$. The lower bound of $\eta$ is zero and the upper bound is adjustable by the user. If a "weakly" relevant edge is excluded, constraints can be imposed on the vehicle's MUTEX entry and exit times to ensure the desired zone utilization. However, instead of coupling multiple vehicles, the constraints are defined at the local vehicle level.

Remark 2: It is worth noting that choosing an excessively large tunable margin (threshold) $\eta$ could lead to a completely decoupled problem, which could result in other issues, such as an increased overall cost and potentially infeasible NLP problems. The first problem arises because the vehicles only focus on their individual goals and do not consider actions that improve mutual goals. The latter issue occurs because the MIQP is an approximation of the NLP, and the suggested entry and exit times could be infeasible. Moreover, when optimizing multiple vehicles, a desired occupancy order can be achieved because the vehicles collaborate with each other's actions, which is not possible in the individual (decoupled) problem. Hence, in implementing the present teachings, it may be advisable to try and find a reasonable compromise between decoupling the problem and an acceptable degree of suboptimal vehicle behavior.

Finding Sub-Graphs

The analysis of the relevant edges has a consequential effect on the adjacency matrix, which defines the connections between vertices. Identifying sub-graphs resulting from the connection of components is a well-known and extensively studied problem in graph theory, for which various algorithms have been proposed, see [24], [25]. In this paper, an algorithm based on [24] is employed that identifies sub-graphs by directly examining the connections of the components. The algorithm is consistent with the depth-first search (DFS) technique, a graph-theoretical tool which can be used for traversing or searching a graph. In this algorithm, a DFS is performed on the graph while keeping track of the visited vertices. This approach allows an exploration of each component of the graph and an identification of the sub-graphs by analyzing the connections between the components. The algorithm is implemented by initializing a stack to store the vertices and an array to keep track of the visited vertices. The algorithm then iteratively visits each vertex in the stack, adding its adjacent vertices to the stack if they have not been visited before. The algorithm continues until all vertices have been visited. The output of the algorithm provides the total size of each sub-graph and the total number of sub-graphs ($N_{SG}$). The running time of the algorithm is linear in the number of vertices and edges, i.e., the asymptotic complexity is $O(|\mathcal{V}|+|\varepsilon|)$.

Implementation of the Method in the Optimization-Based Heuristic

The computational decomposition method is summarized in the following Algorithm 1.

---

Algorithm 1 Computational decomposition method

---

Input: $N_a$, $\mu_k$, vehicle paths
Output: $N_{SG}$
1:  From the vehicle paths obtain all MUTEX zones ($N_{CZ}$) and form the adjacency matrix ($A_{adj}$).
2:  for k = 1 : $N_{CZ}$ do
3:      if $\mu_k \leq \eta$ then
4:          Find what vehicles are affected by the zone, i.e., find indices i, j related to $A_{adj}$.
5:          Reduce the adjacency matrix elements by one $A_{adj}(i, j) = A_{adj}(i, j) - 1; A_{adj}(j, i) = A_{adj}(j, i) - 1$.
6:      if $\mu_k \neq 0$ then
7:          For vehicle i, j impose MUTEX entry and exit time constraints on the individual vehicle problem level to ensure conflict-free occupancy of the zone.
8:      end if
9:      end if
10: end for
11: Find sub-graphs and obtain $N_{SG}$ as done in III-B.

---

The high-level optimization-based approach is invoked at the beginning of the mission and when the plan needs to be recalculated due to changes in the environment, such as a new vehicle being introduced into the optimization, vehicles deviating from the plan, or a certain amount of time has elapsed. When the transport mission starts, the MIQP problem is formed and solved as described in [7]. From the MIQP algorithm, a MUTEX zone occupancy order $\tilde{O}$ is obtained, as well as dual variables which are used to initiate Algorithm 1. After sub-graphs have been found, a number $N_{SG}$ of fixed-order NLPs are solved in parallel to obtain optimal state and control trajectories. Afterward, a safety check is performed on the dropped MUTEX zone constraints.

If the plan needs to be recomputed, the first step is to identify how the environment has changed since the last iteration of the high-level algorithm. This includes identifying which zones the vehicles have passed, checking if new vehicles have entered the optimization problem, and determining if there are new MUTEX zones. A new vehicle can enter the confined site optimization problem when more transportation resources are required to accomplish the productivity goal. If new MUTEX zones or a new vehicle are part of the optimization problem, new crossing orders are calculated and Algorithm 1 is repeated, followed by solving a new set of fixed-order NLPs (possibly with a different cardinality $N_{SG}'$) and a safety check. If the recomputation is triggered by a deviation of one or more vehicles from the motion plan or after some elapsed time, the adjacency matrix must first be updated based on the current conditions. Subsequently, the step of identifying sub-graphs and computing $N_{SG}$ NLPs must be repeated to obtain a motion plan from the current vehicle positions until their mission end. However, since the same order has been maintained, based on the current state of the vehicles, this solution could be suboptimal. To ensure that the new plan is not significantly worse than the previous one, the cost function of the "new" plan may be compared with the cost to go from the previous motion plan calculated from the current vehicle states until the end. If the new plan has a significantly higher cost, the crossing order can be recomputed and Algorithm 1 repeated, after which the new set of NLPs is solved. This comparison reduces the need to always recompute the MIQP and is beneficial in the absence of major deviations in the tracking of the motion plan. Recomputing the crossing order has the potential to improve the cost of the new plan. However, there may be situations where the MIQP results in the same order and there is no improvement in the cost of the new plan compared to the cost to go from the previous plan.

Remark 3: The cost metric for the new plan compared to the previous plan is tunable, and for the use cases considered herein, a metric of 15% or higher triggers a recomputation of the MIQP. The tunable metric (threshold) is denoted by $\xi$.

The recomputation algorithm is summarized in Algorithm 2.

---

Algorithm 2 Optimization-based heuristic
with a computational decomposition method Input: $N_a$, vehicle paths
Output: $\chi^*, \mathcal{U}^*$
1:   if Mission start then
2:     Form and solve an MIQP and obtain $\hat{\mathcal{O}}$.
3:     Run Algorithm 1.
4:     Solve $N_{SG}$ fixed-order NLPs for the found sub-graphs in parallel using $\hat{\mathcal{O}}$ to obtain $\chi^*, \mathcal{U}^*$.
5:     Using $\chi^*, \mathcal{U}^*$ check if any of the dropped MUTEX zone safety constraints have been violated.
6:   else
7:     Identify from the current positions which MUTEX zones have passed.
8:     if New vehicle or new MUTEX then
9:       Form and solve an MIQP and obtain $\hat{\mathcal{O}}$.
10:      Run Algorithm 1 from the current conditions.
11:      Solve $N_{SG}$ fixed-order NLPs for the found sub-graphs in parallel using $\hat{\mathcal{O}}$ to obtain $\chi^*, \mathcal{U}^*$.
12:      Using $\chi^*, \mathcal{U}^*$ check if any of the dropped MUTEX zone safety constraints have been violated.
13:     else
14:      Modify $A_{adj}$.
15:      Find sub-graphs and obtain $N_{SG}$.
16:      Solve $N_{SG}$ fixed-order NLPs for the found sub-graphs in parallel using $\hat{\mathcal{O}}$ to obtain $\chi^*, \mathcal{U}^*$.
17:      Using $\chi^*, \mathcal{U}^*$ check if any of the dropped MUTEX zone safety constraints have been violated.
18:      if Recompute order metric $> \xi$ then
19:        Form and solve an MIQP and obtain $\hat{\mathcal{O}}$.
20:        Run Algorithm 1 from the current conditions.
21:        Solve $N_{SG}$ fixed-order NLPs for the found sub-graphs in parallel using $\hat{\mathcal{O}}$ to obtain $\chi^*, \mathcal{U}^*$.
22:        Using $\chi^*, \mathcal{U}^*$ check if any of the dropped MUTEX zone safety constraints have been violated.
23:      end if
24:     end if
25:   end if

---

Simulation Example

In the present section, a simulation example of a mock-up confined site will be presented that demonstrates the potential benefits of using the computational decomposition method.

Simulation Setup

The vehicle model that is used in the evaluation of the scenarios is a triple integrator $\dddot{x}(t) = u(t)$ modeled in the spatial domain. The optimization problem cost function, constraints, and vehicle parameters are the same as the ones used in [7] and/or as discussed above. The spatial model may be formulated as follows:

$$\begin{bmatrix} \frac{dt_i}{dp_i} \\ \frac{dv_i}{dp_i} \\ \frac{da_i}{dp_i} \end{bmatrix} = \begin{bmatrix} 1/v_i & 0 & 0 \\ 0 & 1/v_i & 0 \\ 0 & 0 & 0 \end{bmatrix} x_i + \begin{bmatrix} 0 \\ 0 \\ 1/v_i \end{bmatrix} u_i,$$

where $a_i$ is the acceleration and $u_i$ is the jerk. The dynamics can discretized using multiple shooting and an Explicit Runge-Kutta-4 (ERK4). The constraints are chosen as bounds on the speed and longitudinal acceleration ($\underline{v}_i \leq v_{i,k} \leq \overline{v}_i$, $a_{i,k} \leq \overline{a}_{i,lon}$) in order to obey speed limits and physical constraints. The vehicles are expected to manoeuvre on curved roads, thus, it is needed to consider the lateral forces they experience. As the one-dimensional model that is used in this disclosure does not account for lateral motion, the following constraint may be enforced:

$$\left(\frac{a_{i,k}}{\overline{a}_{i,lon}}\right)^2 + \left(\frac{\kappa_i(s_{i,k})v_{i,k}}{\overline{a}_{i,lat}}\right)^2 \leq 1,$$

where $\overline{a}_{i,lat}$ is the lateral acceleration limit and $\kappa_i(p_{i,k})$ is the road curvature, which is assumed to be available at every point along the path.

Figure 4:
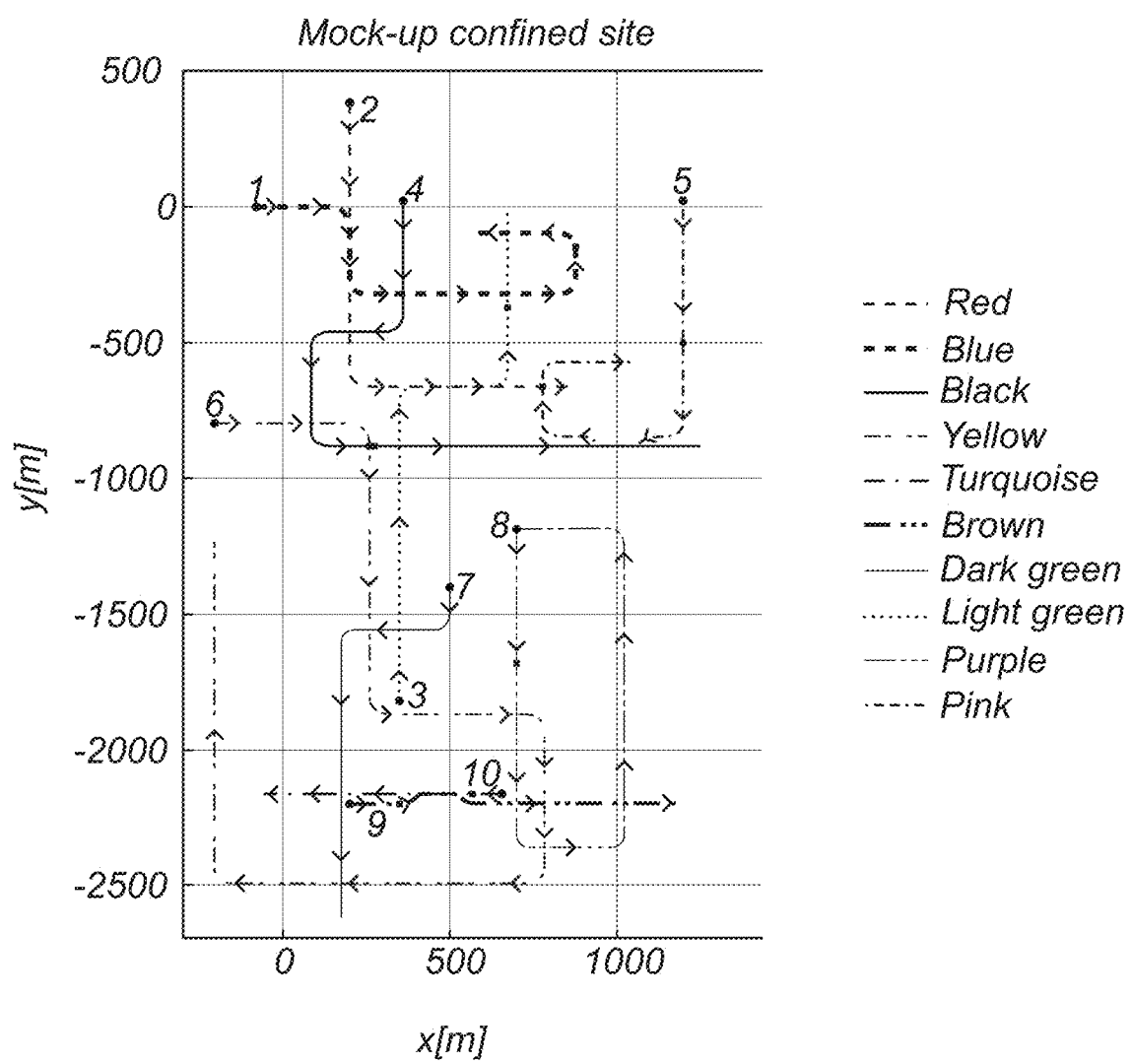
FIG. 4 depicts a mock-up confined site area, in which the vehicles at their initial positions are indicated by circles on the vehicle routes and the vehicles at their positions when the motion plan needs to be recomputed are indicated by squares.

For the evaluation of the method, two instances of the vehicles in a confined site as shown in FIG. 4 will be considered. The figure illustrates the positions of the vehicles at their initial position, and the positions of the vehicles when a recomputation of the motion plan is necessary. The vehicles have a nonzero start time to ensure that a collision occurs in multiple MUTEX zones if no coordinating action is taken. The respective initial times are summarized in Table 1.

TABLE 1

Initial start times for vehicles (seconds)

| $t_{1,0}$ | $t_{2,0}$ | $t_{3,0}$ | $t_{4,0}$ | $t_{5,0}$ | $t_{6,0}$ | $t_{7,0}$ | $t_{8,0}$ | $t_{9,0}$ | $t_{10,0}$ |
|---|---|---|---|---|---|---|---|---|---|
| 6.7 | 6.2 | 0 | 13 | 71 | 64 | 105.25 | 76 | 86.5 | 90.5 |

The recomputation trigger is after 96.5 seconds. At this point, only Vehicle 7 is still at its initial position.

Figure 8:
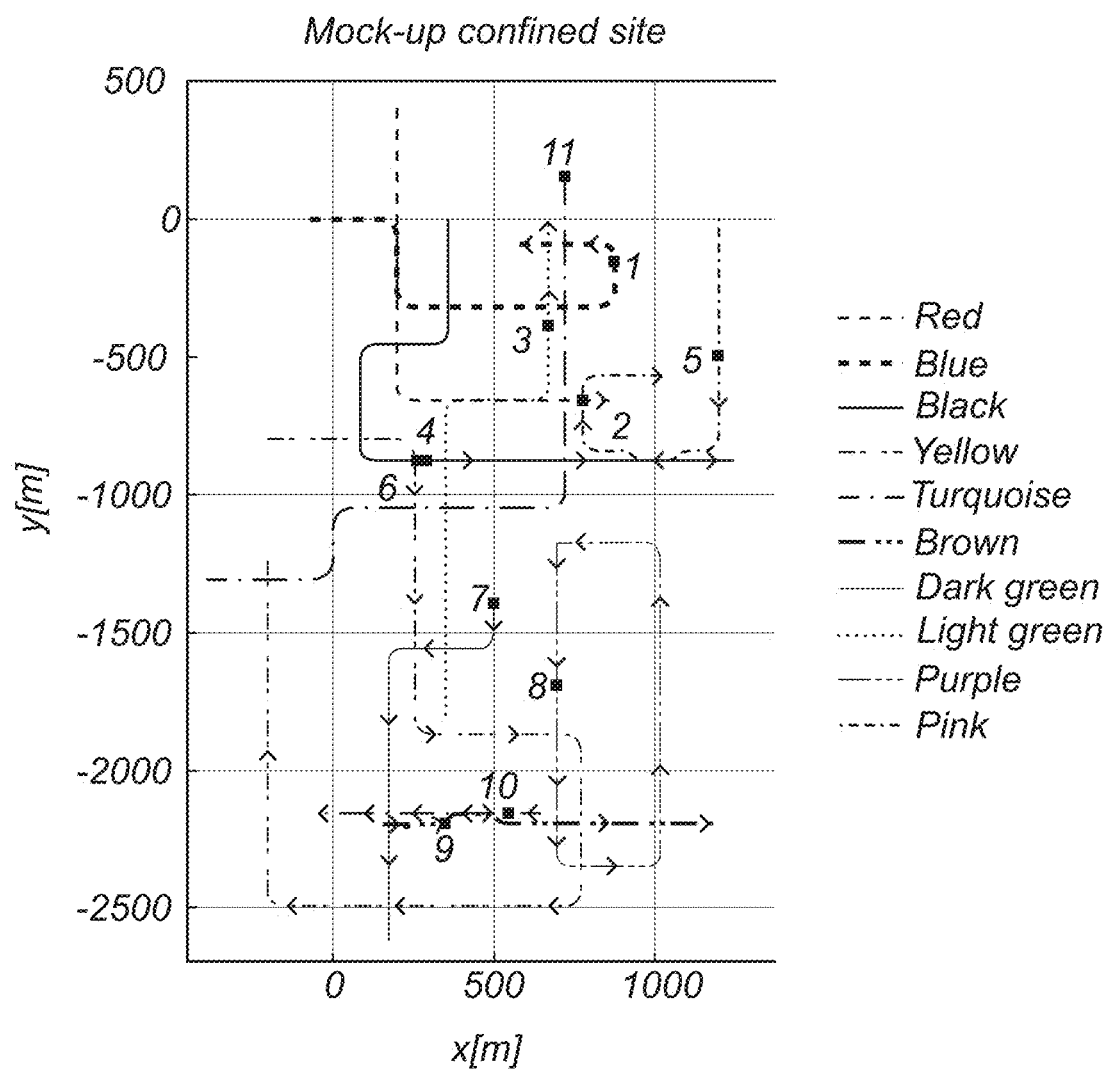
FIG. 8 depicts a mock-up confined site area, in which the vehicles at their positions when the motion plan needs to be recomputed and a new vehicle enters the optimization problem are indicated by squares.

In addition to these two instances, the scenario when a new vehicle is added to the optimization problem will be considered. The new vehicle enters at the same instance as when, in the previous example, it became necessary to recompute the motion plan, i.e., after 96.5 seconds. The scenario is illustrated in FIG. 8. The simulation scenario is implemented in MATLAB on a 2.10 GHZ $12^{th}$-generation Intel i7 with 32 GB of RAM. The CasADi [27] toolkit and IPOPT [28] are utilized to formulate and solve the NLP, and Gurobi is used for the MIQP.

Discussion of Simulation Results

Figure 5C:
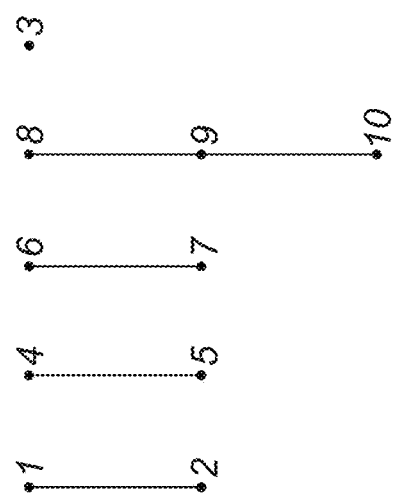
FIGS. 5A-5C show graphs for a first scenario using different methods.
Figure 5B:
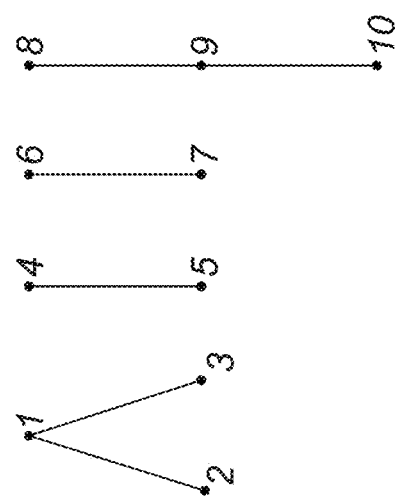
Figure 5A:
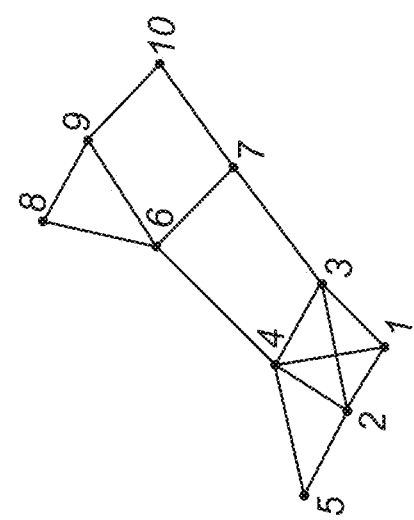
Figure 6C:
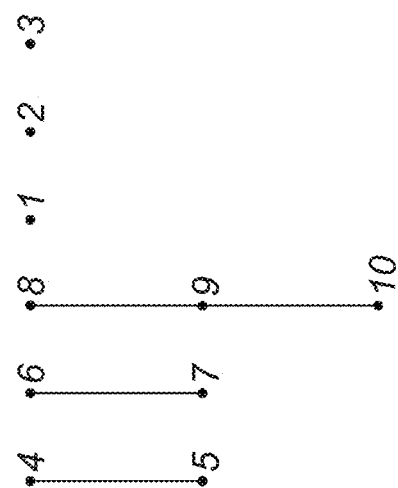
FIGS. 6A-6C show graphs for a second scenario using different methods.
Figure 6B:
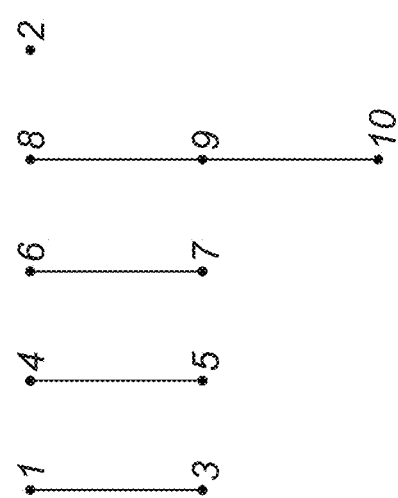
Figure 6A:
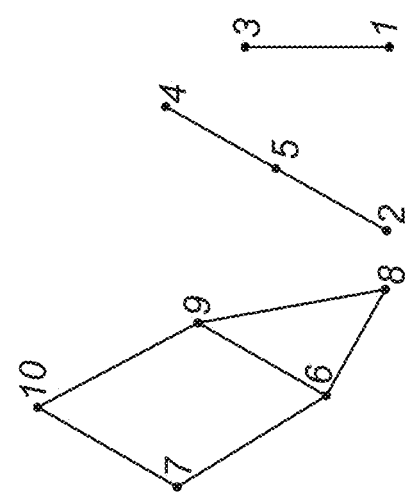

In the following, the results for this simulation scenario are presented, with a focus on the graphs and sub-graphs formed using graph theory alone and the method proposed in this paper. FIGS. 5 and 6 show the graphs obtained when the vehicles are at their initial positions and when the motion plan needs to be recomputed. The graphs in FIGS. 5A and 6A are obtained by checking which vehicles share a MUTEX zone from their current position until their end destination. The graphs in FIGS. 5B and 5C and those in FIGS. 6B and 6C are obtained using the method described in above section "Identifying vehicle subsets" with a tunable decomposition margin (threshold) $\eta=0$ and $\eta=0.45$, respectively.

As shown in the figure, for both scenarios the approach identifies that some connections are not necessary as their MUTEX constraints are not restricting the problem solution. Analyzing the position of the MUTEX zones that are "dropped" by the method in FIG. 4, it is observed that these are zones where there would be a significant time gap in the occupancy times for the interacting vehicles, either due to the position of the zone with respect to the path of the vehicles or the initial start times. For example, analyzing Vehicle 3 and Vehicle 7 closely, it can be noticed that their common MUTEX zone is located at substantially equal distances (e.g., in path length coordinate) on their respective paths. However, due to the start time of Vehicle 7, that zone would not cause any necessary changes in the respective motion profiles to avoid violating the safety constraint for the zone.

For the case of $\eta=0.45$, the higher value of the threshold causes connections that are "weakly" active to be dropped as well. In both cases, the connection between Vehicle 1 and Vehicle 3 is dropped, as although a collision would occur in the zone they share if no coordinating action was taken, the MUTEX zone is far in time and distance, and the vehicles have a large control capability to avoid the conflict. Thus, this constraint has little influence on the overall solution to the problem.

Figure 7C:
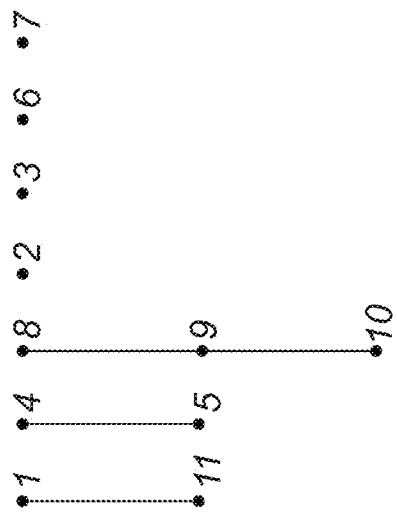
FIGS. 7A-7c show graphs for a third scenario using different methods.
Figure 7B:
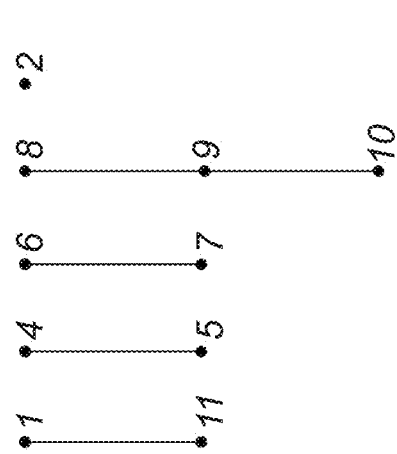
Figure 7A:
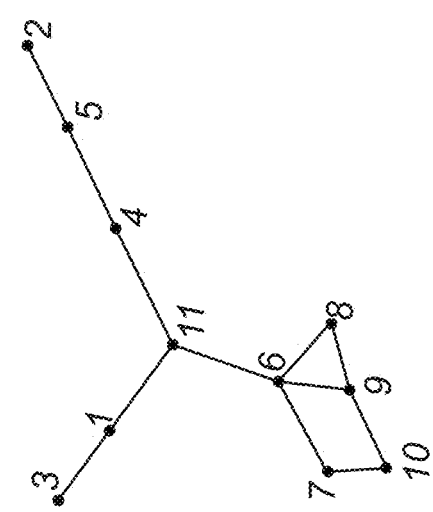

FIG. 8 illustrates the case where a new vehicle enters the optimization problem, along with the graph representations for the case when the sub-graphs are formed only by looking at the connections (FIG. 7A), and when the decomposition method is used (FIG. 7B with $\eta=0$, and FIG. 7C with $\eta=0.45$). When Vehicle 11 enters the plan, it shares a MUTEX zone with Vehicle 1 and Vehicle 4 and also with Vehicle 6, which results in coupling all the vehicles so that no sub-graphs can be found. For this case, as noted in Algorithm 2, the appearance of new MUTEX zones suggest that the MIQP should be recomputed. Using the dual variables from the new MIQP and the decomposition algorithm, four sub-graphs are obtained, and it becomes clear that three of the vehicles have no coupling at all.

Figure 9:
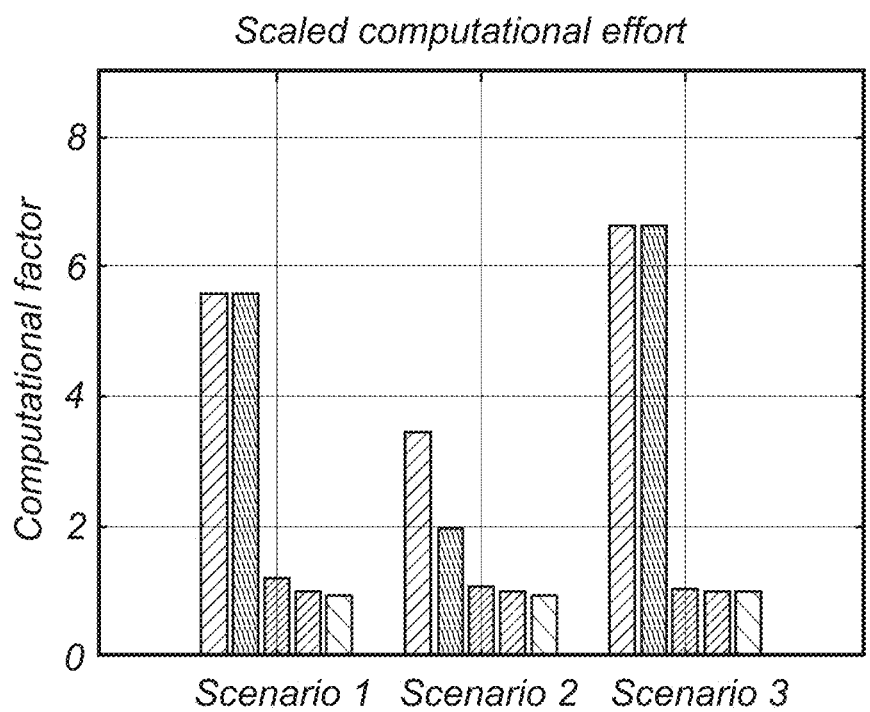
FIG. 9 visualizes a comparison of the computational demand of the NLPs for the three scenarios. The first (leftmost) bar in each group refers to the case where no graph decomposition is used, so that in all instances the NLP is solved for all vehicles jointly. The second bar in each group represents the computational time for the NLP(s) obtained only by considering graphs or sub-graphs based on the oncoming MUTEX zones. The third, fourth and fifth bar refers to the methods disclosed herein for different values of FIG. 10 depicts a mock-up confined site area with multiple narrow roads.

FIG. 9 presents a comparison of the computational effort required to solve the problem using different decomposition techniques in three scenarios: when the vehicles are at their initial positions (Scenario 1); when the plan needs to be recomputed (Scenario 2); and when a new vehicle enters the optimization problem, causing all vehicles to be connected again (Scenario 3). The first data bar correspond to the case where no decomposition is applied, i.e., only one NLP is solved involving all vehicles and MUTEX zones. The second bar correspond to the NLP solve times for the graphs depicted in FIGS. 5A, 6A and 8A. In Scenario 1 and Scenario 3, all vehicles are connected through MUTEX zones, resulting in only one NLP that involves all vehicles. In Scenario 2, the vehicles have traveled some distance, and have passed some MUTEX zones, leading to three sub-graphs which means that three NLPs can be computed in parallel. The reported time for this case is the highest time of one of these NLPs.

The third, fourth and fifth data bars in FIG. 9 represent the computational effort required to solve the NLPs using the method presented in this disclosure with different values of the threshold $\eta$: $\eta=0$, $\eta=0.45$, and $\eta \geq 20$, respectively. When $\eta \geq 20$, the problem is fully decomposed, and there are no couplings in the graph. Since the computational demand values for the fully decomposed case are the lowest observed, they will be used to scale the data, leading to a value of 1 for the fifth data bar. The cases with $\eta=0$ and $\eta=0.45$ result in a relatively small increase in computational demand compared to the fully decomposed case.

Remark 4: It is possible that, when $\eta=0$, the method does not obtain any sub-graphs due to the scenario construction. However, for long-horizon optimization, where the vehicles have multiple MUTEX zones, it is expected that not all of the zones will have an impact on the solution to the optimization problem.

For the case when the plan needs to be recomputed (Scenario 2), the MUTEX order does not need to be recomputed since the cost metric comparison did not pass the threshold, i.e., the recompute order metric is less than $\xi$. The subgraphs are found using the dual variables from the MIQP computed for the start of the mission. Furthermore, FIG. 9 shows that when all vehicles are considered in one NLP, regardless of the current conditions, the computational demand of that problem is significantly higher than the alternatives. This was the approach used in the inventors' previous work [7].

The computational benefit of the decomposed cases when $\eta > 0$ comes at the cost of a minor increase in the cost-function value, as summarized in Table 2.

TABLE 2

Cost function value of the presented scenarios using different methods

| Method | Scenario 1 | Scenario 2 | Scenario 3 |
|---|---|---|---|
| All vehicles combined | 18058 | 8112.9 | 9605.4 |
| No graph decomposition | 18058 | 8112.9 | 9605.4 |
| Graph decomposition $\eta=0$ | 18058 | 8112.9 | 9605.4 |
| Graph decomposition $\eta=0.45$ | 18062 | 8114.6 | 9605.45 |
| Fully decomposed $\eta \geq 20$ | 18069 | 8117.2 | 9606.1 |

A reason for the minor increase in the cost function is that the MIQP approximates the problem well, resulting in MUTEX entry and exit times that the NLP can satisfy. Additionally, the scenarios are constructed such that the MUTEX zones occur after some distance for the vehicles, allowing them enough time and space to adjust their state and control trajectories. While this is expected to be the general case for long-horizon optimization in confined sites, it is still important to investigate the trade-off, as there could be scenarios where the performance loss of the fully decomposed case becomes significant, as further discussed in the following subsection.

Suboptimality of Decomposition

Figure 10:
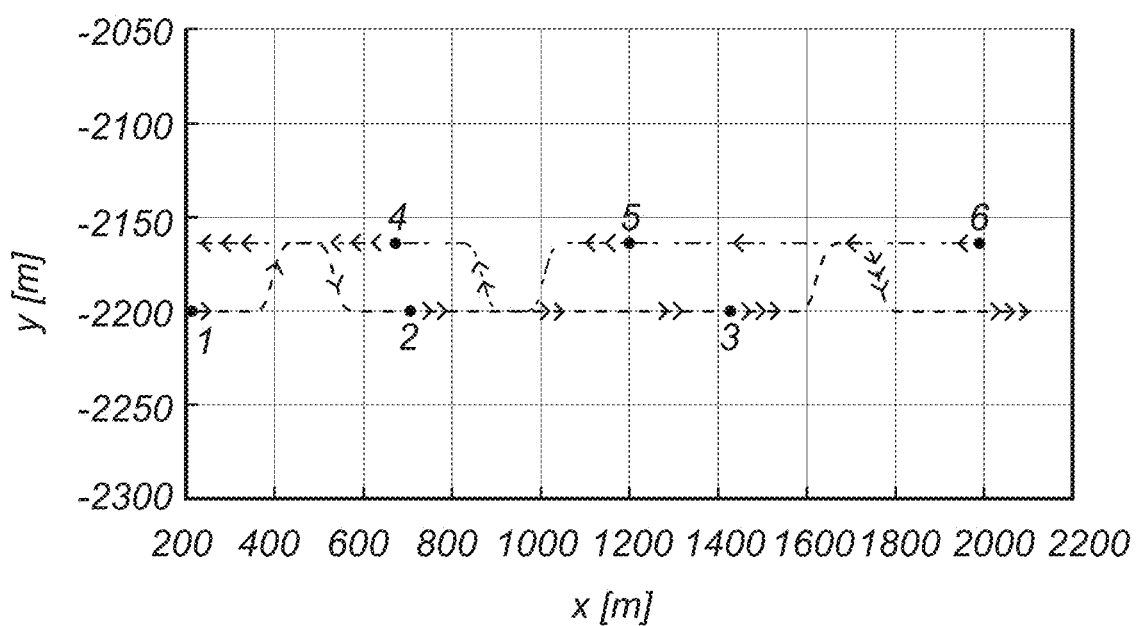

As noted in above Remark 2, non-zero values of the decomposition metric result in a more decomposed problem, which may lead to suboptimal solutions compared to the solution obtained when the metric is equal to zero. In the previous scenarios examined in this paper, the suboptimality induced by the decomposition was relatively small due to the problem's construction, but this is not necessarily always the case. For instance, consider the scenario illustrated in FIG. 10, which depicts a site with six vehicles on a road network comprising several narrow roads. Due to the initial positions of the vehicles, if no coordinating action is taken, collisions will occur on the narrow roads.

Figure 11C:
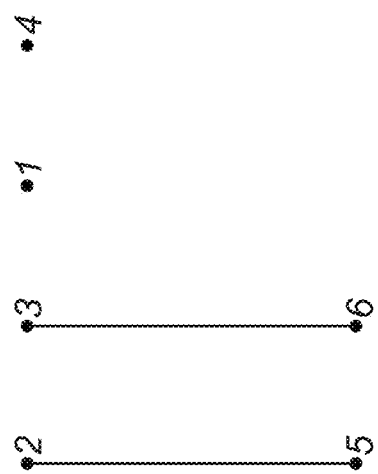
FIGS. 11A-11C show graphs for the scenario with multiple narrow roads using different methods.
Figure 11B:
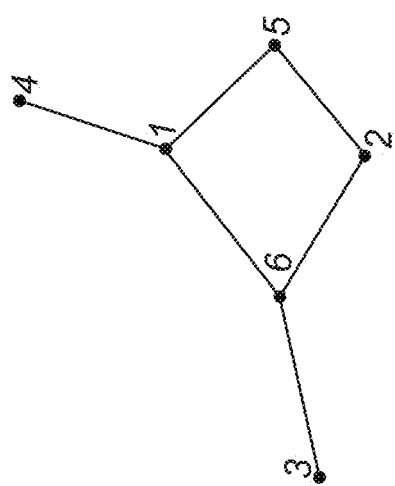
Figure 11A:
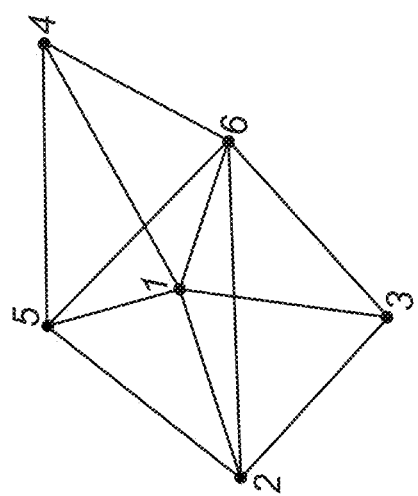

The graphs for this scenario are presented in FIG. 11. Unlike the previous scenarios, when the decomposition method is used with $\eta=0$, no sub-graph at all is obtained, and the problem must be solved for all vehicles combined. Increasing the $\eta$ parameter yields sub-graphs, as shown in FIG. 11C. For this scenario, when $\eta \geq 16$, the problem will be fully decomposed. Table 3 summarizes the scaled computational and performance factors of the different methods used in this scenario.

TABLE 3

Comparison of methods

| Method | Computational factor | Performance factor |
|---|---|---|
| All vehicles combined | 2.4 | 1 |
| No graph decomposition | 2.4 | 1 |
| Graph decomposition $\eta = 0$ | 1.18 | 1 |
| Graph decomposition $\eta = 11.5$ | 1.05 | 1.11 |
| Fully decomposed $\eta \geq 16$ | 1 | 1.193 |

The scaling is done relative to the lowest value, which, for the computational factor analysis, is for the fully decomposed case, while for the performance factor, it is for any of the first three cases (i.e., when all vehicles are solved together or when $\eta=0$).

For this scenario, the performance loss of the fully decomposed case is more significant, resulting in a 19.3 percent increase in the cost function value. There is still a compelling improvement in the computational effort, particularly when compared to scenarios where the decomposition method is not employed. As in the previous scenarios, the computational improvement with respect to the $\eta=0$ case is relatively minor. Therefore, it may be advisable to investigate the trade-offs before deciding on the decomposition metric it for a given scenario. Moreover, it is noted that the fully decomposed case in this scenario would yield an infeasible result if the starting speed of the vehicles were higher, whereas this is not the case for the other methods. This limitation is due to the MIQP's approximation of the problem, and the suggested MUTEX entry and exit times may be infeasible to satisfy for the NLP. Consequently, it is not desirable to fully decompose every problem. Instead, the method presented in this disclosure can be used as a tool to determine the decomposition of the problem, such that the computational effort is improved to a desired level while being aware of the potential performance loss.

Preliminary Conclusions

In the present disclosure, the inventors have presented a process for a computational decomposition of an optimization-based algorithm for the coordination of automated vehicles in confined sites. The method is based on a graph model where the vehicles are the graph's vertices and the MUTEX zones that the vehicles experience are the graph's edges. The information on the dual variables related to the MUTEX zone constraints can be used as a guidance to identify which edges can further be dropped from the graph. The next step of the algorithm looks at whether there are any sub-graphs, which is related to the question of how many parallel optimization problems can be solved. The method is included in the recomputation algorithm for the optimization-based heuristic. Because the method is amenable to parallel computing, a reduced overall computational time can be achieved, as has been demonstrated in the three simulation scenarios.

Implementations

Figure 13:
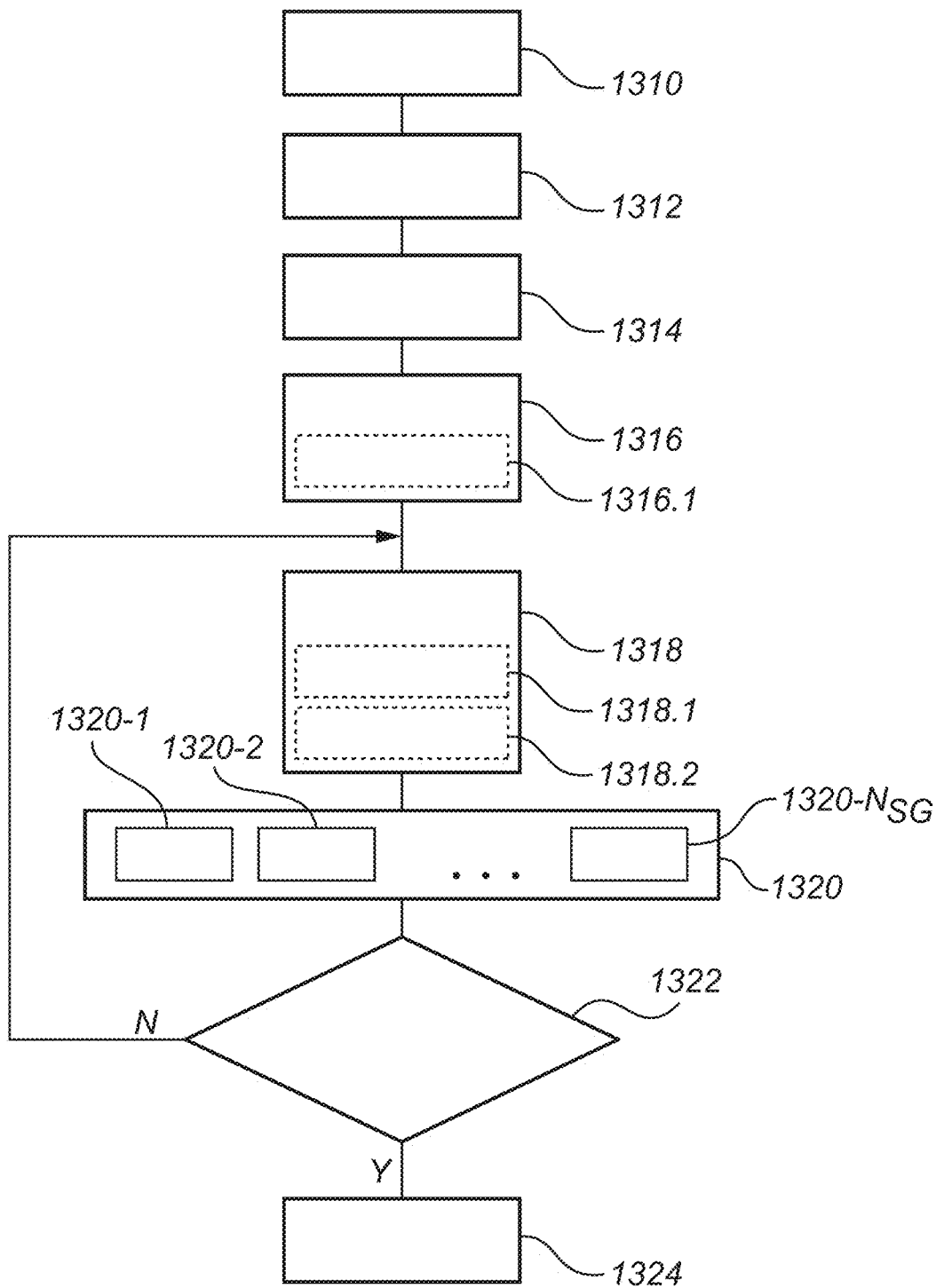
FIG. 13 is a flowchart of trajectory-planning methods according to embodiments herein.

FIG. 13 is a flowchart of a method 1300 for controlling a plurality of vehicles 1460 (see FIG. 14) operating in a common environment 1400 which includes at least one MUTEX zone, wherein movements of an $i^{th}$ vehicle are controllable by a control signal $u_i$. A vector of multiple such control signals $u_i$ may be denoted by $U=(u_1, u_2, \ldots, u_{N_a})$. In the currently envisioned use cases, the number $N_a$ of controlled vehicles 1460 may be at least 2, such as at least 5, such as at least 10, such as at least 20, such as at least 50, such as at least 100, such as at least 200. In some examples, the number $N_a$ of controlled vehicles 1460 does not exceed 50.

The execution of the method 1300 may be coordinated by a central processing resource being either fixedly installed or vehicle-carried. In the following description, by way of example, it will be assumed that the execution of the method 1300 is coordinated by processing circuitry 1452 fixedly installed in a computer system 1450. As suggested by FIG. 15, the computer system 1450 can delegate the execution of some steps of the method 1300, or parts thereof, to vehicle-carried processing resources (e.g., processing circuitry 1462) by transmitting a corresponding delegation signal D to the vehicles 1460 over the wireless interface 1451 and receiving a processing result message E in return.

In a first step 1310 of the method 1300, current positions of all vehicles are sensed. The vehicle positions may be self-reported positions represented by a signal P (see FIG. 15) transmitted from each vehicle 1460 to the computer system 1450. The transmission of the signal P may be event-triggered, periodic or triggered by a request (not shown) transmitted from the computer system 1450 to the vehicles 1460.

In a second step 1312 of the method, a predefined vehicle path to be traversed is obtained for each vehicle. A path together with indications relating to the timing of the vehicle's movement along the path is referred to as a trajectory in the present disclosure.

In a third step, a first computation 1314 to obtain a vehicle crossing order 6 at each MUTEX zone 1410, 1420, 1430 between two vehicle paths is performed, wherein the first computation is subject to safety constraints. In some examples, the first computation 1314 is an optimization problem. For example, the first computation 1314 may be an optimization problem which is solved as a mixed-integer quadratic program (MIQP). Alternatively, the first computation 1314 can be carried out as a sorting algorithm, for example a distance-based First Come First Served algorithm.

In a next step 1316, a dependency metric is assigned to each pair of vehicles that can be formed of the vehicles.

In a next step 1318, the vehicles are partitioned into a number $N_{SG}$ of vehicle subsets such that the dependency metric exceeds a threshold $\eta$ within each subset. In particular, the partition is such that the threshold $\eta$ is exceeded by the dependency metric for each pair of vehicles that can be formed of the vehicles in the subset. Optionally, the threshold can be determined 1316.1 based on the assigned values of the dependency metric, e.g., to obtain a number $N_{SG}$ of subsets that may suit the implementation well, notably a parallelization capability. This may be achieved by setting the threshold based on a suitable statistic of the assigned values of the dependency metric, such as one or more p-quantiles, a histogram, a cumulative distribution function or the like.

To form the vehicle subsets in step 1318, a first substep 1318.1 of forming a weighted graph where nodes represent vehicles and where edges represent MUTEX zones may be executed and then followed by a second substep 1318.2 of performing a depth-first search (DFS; see above) to determine subgraphs. The determined subgraphs corresponds to the vehicle subsets.

The execution of the method 1300 then proceeds to trajectory planning 1320. The trajectory planning 1320 is performed by having the processing circuitry 1452 (or another processor) execute an algorithm or heuristic which provides indications relating to the timing of the vehicle's movement along the vehicles path subject to the constraint that the vehicle crossing order at the MUTEX zones, which was obtained in step 1314, shall be respected. The algorithm may be configured (e.g., through a suitable choice of a cost function) to minimize standstill time, avoid congestion in areas of the environment 1400, avoid vehicle collisions, minimize energy consumption, execute a user-defined transport mission and/or pursue other desirable goals. The trajectory planning is performed as multiple independent subproblems 1320-1, 1320-2, . . . , 1320-$N_{SG}$, each relating to one of the vehicle subsets. The output of the trajectory planning 1320 includes a control signal $u_i$ for each of the vehicles.

The subproblems 1320-1, 1320-2, . . . , 1320-$N_{SG}$ may be independent in the sense that no information exchange between the subproblems 1320-1, 1320-2, . . . , 1320-$N_{SG}$ is necessary for successful execution. Additionally or alternatively, the subproblems 1320-1, 1320-2, . . . , 1320-$N_{SG}$ may be independent in the sense that they can be executed in any order and/or in a time-overlapping fashion, whereby efficient parallelization is possible. The subproblems 1320-1, 1320-2, . . . , 1320-$N_{SG}$ may be solved as optimal control problems (OCPs) for a predefined cost function. As noted above, the cost function may be related to a dynamic vehicle model, and it may include costs such as energy consumption, wear, servicing needs, etc.

Figure 15:
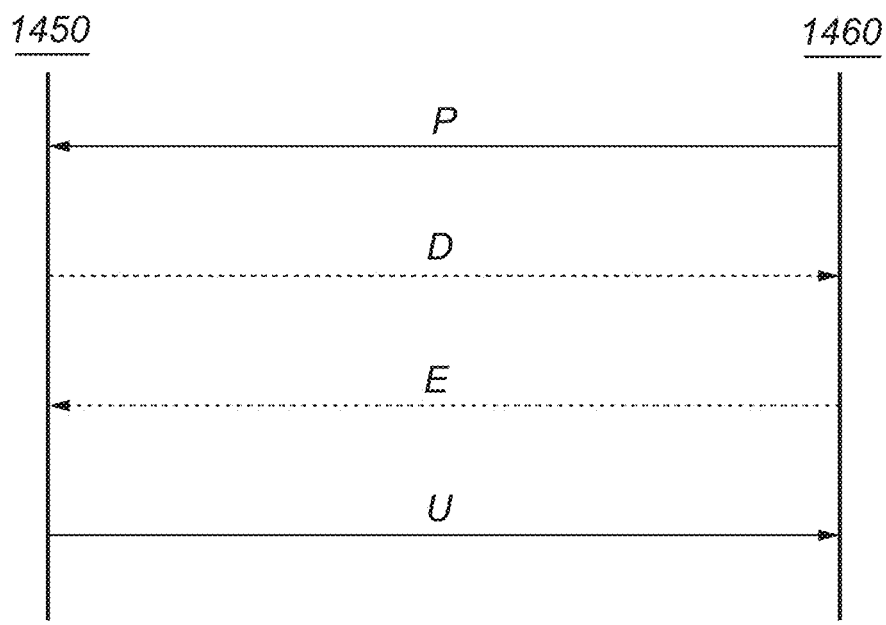
FIG. 15 is a sequence diagram showing an exchange of signals between a vehicle and a device configured to control a group (fleet) of vehicles to which the vehicle belongs. It is understood that a corresponding exchange of signals with each vehicle in said group takes place.

In a step 1324, the control signals $U=(u_1, u_2, \ldots, u_N)$ are then fed to the vehicles 1460 for execution; see FIG. 15.

Optionally, step 1324 is conditional upon a positive outcome of a verification 1322 that the control signals obtained in step 1320 fulfil (Y branch) the safety constraints of the first computation 1314. This is particularly relevant in such example embodiments where the subproblems 1320-1, 1320-2, . . . , 1320-$N_{SG}$ are independent of said safety constraints. If the outcome of the verification 1322 is negative (N branch), then the execution flow of the method 1300 may loop back to the step 1318 of partitioning the vehicles into vehicle subsets, which may result in a different number $N_{SG}' \neq N_{SG}$ of new subsets. The trajectory planning 1320 is then performed anew using the new subsets, after which the new control signals are verified 1322.

In some implementations, a negative outcome of the verification 1322 may cause the processing circuitry 1452 to not forward the control signals U to the vehicles 1460. In other implementations, the negative outcome may cause the processing circuitry 1452 to forward the control signals U to the vehicles 1460 but without an accompanying approval signal which, according to an applicable communication protocol or foregoing agreement with the vehicles 1460, is a necessary prerequisite for the vehicles 1460 to execute the control signals U.

The dependency metric can be derived in a number of different ways. According to one option, if the first computation 1314 is an optimization problem, the dependency metric is derived from the solving of said optimization problem. In particular, the dependency metric for a pair of vehicle paths may be related to one or more dual optimization variables $\mu_k$ associated with safety constraints for the MUTEX zones between these vehicle paths. In implementations, the above-defined adjacency matrix $A_{adj}$ may be formed, in which the elements correspond to pairs of the vehicles. If a safety constraint for a MUTEX zone between the paths of the corresponding vehicle has an associated dual optimization variable which is less than the threshold, then a corresponding nonzero element in the adjacency matrix is reduced; see Algorithm 1. If the coordination graph is defined with bidirectional edges, like in FIG. 3, the mirror-symmetric element of said corresponding nonzero element in the adjacency matrix is reduced as well. The adjacency matrix can then be used, after these reductions, for partitioning the vehicles into subsets (step 1318).

According to another option, the dependency metric for a pair of vehicle paths is related to the number of MUTEX zones between these vehicle paths, e.g., a linearly or non-linearly scaled value of this number. This option is applicable without a restriction that the first computation 1314 must be an OCP with dual optimization variables as weights; rather, different weights can be used. Further, the dependency metric can be further related to a dependency importance weight, which is applied as a scaling factor to the number of MUTEX zones. The dependency importance weight represents a time separation of consecutive crossing vehicles at a MUTEX zone according to the crossing order 6. Alternatively, the dependency importance weight represents an expected time separation of consecutive crossing vehicles according to some suitable heuristics.

Remarks on Computer System

The computer system 1450 shown in FIG. 14 is adapted to execute instructions from a computer-readable medium to perform these and/or any of the functions or processing described herein. The computer system 1450 may be connected (e.g., networked) to other machines in a LAN, an intranet, an extranet, or the Internet. In particular, the computer system 1450 may be connected to the processing circuitry 1462 of the vehicles 1460 over a vehicle-to-infrastructure (V2I), vehicle-to-vehicle (V2V) or vehicle-to-everything (V2X) connection. The connections may be supported by a cellular or non-cellular access network and associated core network. While only a single device is illustrated, the computer system 1450 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1450 may comprise at least one computing device or electronic device capable of including firmware, hardware, and/or executing software instructions to implement the functionality described herein. The computer system 1450 may include processing circuitry 1452 (e.g., processing circuitry including one or more processor devices or control units), a memory, and a system bus. The computer system 1450 may include at least one computing device having the processing circuitry 1452. The system bus provides an interface for system components including, but not limited to, the memory and the processing circuitry 1452. The processing circuitry 1452 may include any number of hardware components for conducting data or signal processing or for executing computer code stored in memory. The processing circuitry 1452 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1452 may further include computer executable code that controls operation of the programmable device.

The system bus may be any of several types of bus structures that may further interconnect to a memory bus (with or without a memory controller), a peripheral bus, and/or a local bus using any of a variety of bus architectures. The memory may be one or more devices for storing data and/or computer code for completing or facilitating methods described herein. The memory may include database components, object code components, script components, or other types of information structure for supporting the various activities herein. Any distributed or local memory device may be utilized with the systems and methods of this description. The memory may be communicably connected to the processing circuitry 1452 (e.g., via a circuit or any other wired, wireless, or network connection) and may include computer code for executing one or more processes described herein. The memory may include non-volatile memory (e.g., read-only memory (ROM), erasable programmable read-only memory (EPROM), electrically erasable programmable read-only memory (EEPROM), etc.), and volatile memory (e.g., random-access memory (RAM)), or any other medium which can be used to carry or store desired program code in the form of machine-executable instructions or data structures and which can be accessed by a computer or other machine with processing circuitry 1452. A basic input/output system (BIOS) may be stored in the non-volatile memory and can include the basic routines that help to transfer information between elements within the computer system 1450.

The computer system 1450 may further include or be coupled to a non-transitory computer-readable storage medium such as the storage device, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device and/or in the volatile memory, which may include an operating system and/or one or more program modules. All or a portion of the examples disclosed herein may be implemented as a computer program stored on a transitory or non-transitory computer-usable or computer-readable storage medium (e.g., single medium or multiple media), such as the storage device, which includes complex programming instructions (e.g., complex computer-readable program code) to cause the processing circuitry 1452 to carry out actions described herein. Thus, the computer-readable program code of the computer program can comprise software instructions for implementing the functionality of the examples described herein when executed by the processing circuitry 1452. In some examples, the storage device may be a computer program product (e.g., readable storage medium) storing the computer program thereon, where at least a portion of a computer program may be loadable (e.g., into a processor) for implementing the functionality of the examples described herein when executed by the processing circuitry 1452. The processing circuitry 1452 may serve as a controller or control system for the computer system 1450 that is to implement the functionality described herein.

The computer system 1450 may include an input device interface configured to receive input and selections to be communicated to the computer system 1450 when executing instructions, such as from a keyboard, mouse, touch-sensitive surface, etc. Such input devices may be connected to the processing circuitry 1452 through the input device interface coupled to the system bus but can be connected through other interfaces, such as a parallel port, an Institute of Electrical and Electronic Engineers (IEEE) 1394 serial port, a Universal Serial Bus (USB) port, an IR interface, and the like. The computer system 1450 may include an output device interface configured to forward output, such as to a display, a video display unit (e.g., a liquid crystal display (LCD) or a cathode ray tube (CRT)). The computer system 1450 may include a communications interface suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software.

Although a specific order of method actions may be shown or described, the order of the actions may differ. In addition, two or more actions may be performed concurrently or with partial concurrence.

Closing Remarks

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

REFERENCES

1. Bagloee, Saeed Asadi, Madjid Tavana, Mohsen Asadi, and Tracey Oliver. "Autonomous vehicles: challenges, opportunities, and future implications for transportation policies." *Journal of modern transportation* 24, no. 4 (2016): 284-303.
2. Rios-Torres, Jackeline, and Andreas A. Malikopoulos. "A survey on the coordination of connected and automated vehicles at intersections and merging at highway on-ramps." *IEEE Transactions on Intelligent Transportation Systems* 18, no. 5 (2016): 1066-1077.
3. Colombo, Alessandro, and Domitilla Del Vecchio. "Efficient algorithms for collision avoidance at intersections." *In Proceedings of the 15th ACM international conference on Hybrid Systems: Computation and Control*, pp. 145-154. 2012.
4. Katriniok, Alexander, Peter Kleibaum, and Martina Josevski. "Distributed model predictive control for intersection automation using a parallelized optimization approach." *IFAC-PapersOnLine* 50, no. 1 (2017): 5940-5946.
5. Hult, Robert, Mario Zanon, Sebastien Gras, and Paolo Falcone. "An miqp-based heuristic for optimal coordination of vehicles at intersections." In 2018 *IEEE Conference on Decision and Control (CDC)*, pp. 2783-2790. IEEE, 2018.
6. Zhang, Yue J., Andreas A. Malikopoulos, and Christos G. Cassandras. "Optimal control and coordination of connected and automated vehicles at urban traffic intersections." In 2016 *American Control Conference (ACC)*, pp. 6227-6232. IEEE, 2016.
7. Kojchev, Stefan, Robert Hult, and Jonas Fredriksson. "Quadratic approximation based heuristic for optimization-based coordination of automated vehicles in confined areas." In 2022 *IEEE 61st Conference on Decision and Control (CDC)*, pp. 6156-6162. IEEE, 2022.
8. Bondy, John Adrian, and Uppaluri Siva Ramachandra Murty. *Graph theory with applications*. Vol. 290. London: Macmillan, 1976.
9. Wilson, Robin J. *Introduction to graph theory*. Pearson Education India, 1979.
10. Hendrickson, Bruce, and Tamara G. Kolda. "Graph partitioning models for parallel computing." *Parallel computing* 26, no. 12 (2000): 1519-1534.
11. Bulug, Aydin, Henning Meyerhenke, Ilya Safro, Peter Sanders, and Christian Schulz. *Recent advances in graph partitioning*. Springer International Publishing, 2016.
12. Benfenati, Alessandro, Emilie Chouzenoux, Laurent Duval, Jean-Christophe Pesquet, and Aurélie Pirayre. "A review on graph optimization and algorithmic frameworks.", Research Report, LIGM—Laboratoire d'Informatique Gaspard-Monge. 2018. hal-0190149.
13. Karakoç, Nurullah, Anna Scaglione, Angelia Nedić, and Martin Reisslein. "Multi-layer decomposition of network utility maximization problems." *IEEE/ACM Transactions on Networking* 28, no. 5 (2020): 2077-2091.
14. Chino, Naohito. "An elementary theory of a dynamic weighted digraph (1)." In *Proceedings of the 46th annual meeting of the behaviormetric society of Japan*, pp. 26-29. 2018.
15. Martinez, Stephane, Gano Chatterji, Dengfeng Sun, and Alexandre Bayen. "A weighted-graph approach for dynamic airspace configuration." In *AIAA guidance, navigation and control conference and exhibit*, p. 6448. 2007.
16. Cao, Yongcan, Wenwu Yu, Wei Ren, and Guanrong Chen. "An overview of recent progress in the study of distributed multi-agent coordination." *IEEE Transactions on Industrial informatics* 9, no. 1 (2012): 427-438.
17. Shi, Peng, and Bing Yan. "A survey on intelligent control for multiagent systems." *IEEE Transactions on Systems, Man, and Cybernetics: Systems* 51, no. 1 (2020): 161-175.
18. Mirheli, Amir, Mehrdad Tajalli, Leila Hajibabai, and Ali Hajbabaie. "A consensus-based distributed trajectory control in a signal-free intersection." *Transportation research part C: Emerging technologies* 100 (2019): 161-176.
19. Wei Ren, R. W. Beard and E. M. Atkins, "A survey of consensus problems in multi-agent coordination," Proceedings of the 2005 *American Control Conference*, 2005., Portland, OR, USA, 2005, pp. 1859-1864 vol. 3, doi: 10.1109/ACC.2005.1470239.
20. Restrepo, Esteban, Antonio Loria, Ioannis Sarras, and Julien Marzat. "Consensus of Open Multi-agent Systems over Dynamic Undirected Graphs with Preserved Connectivity and Collision Avoidance." In 2022 *IEEE 61st Conference on Decision and Control (CDC)*, pp. 4609-4614. IEEE, 2022.
21. Pallottino, Lucia, Vincenzo Giovanni Scordio, and Antonio Bicchi. "Decentralized cooperative conflict resolution among multiple autonomous mobile agents." In 2004 $43^{rd}$ *IEEE Conference on Decision and Control (CDC)(IEEE Cat. No.* 04CH37601), vol. 5, pp. 4758-4763. IEEE, 2004.
22. Richards, Arthur, and Jonathan How. "Mixed-integer programming for control." In *Proceedings of the* 2005 *American Control Conference*, pp. 2676-2683. IEEE, 2005
23. Nocedal, Jorge, and Stephen Wright. *Numerical optimization*. Springer Science & Business Media, 2006.
24. Tarjan, Robert. "Depth-first search and linear graph algorithms." *SIAM Journal on computing* 1, no. 2 (1972): 146-160.
25. Cormen, Thomas H., Charles E. Leiserson, Ronald L. Rivest, and Clifford Stein. *Introduction to algorithms*. MIT Press, 2022.
26. *MATLAB*. version 9.13.0.2105380 (R2022b) Update 2. Natick, Massachusetts: The MathWorks Inc.; 2010.
27. Andersson, Joel A E, Joris Gillis, Greg Horn, James B. Rawlings, and Moritz Diehl. "CasADi: a software framework for nonlinear optimization and optimal control." *Mathematical Programming Computation* 11, no. 1 (2019): 1-36.
28. Wächter, Andreas, and Lorenz T. Biegler. "On the implementation of an interior-point filter line-search algorithm for large-scale nonlinear programming." *Mathematical Programming* 106, no. 1 (2006): 25-57.

The invention claimed is:

1. A method of planning trajectories for a plurality of vehicles operating in a common environment, wherein movements of each vehicle are controllable by a control signal, the method comprising:
 for each vehicle, obtaining a predefined vehicle path to be traversed;
 performing a first computation to obtain a vehicle crossing order $\hat{O}$ at each mutually exclusive zone, MUTEX zone between two vehicle paths, wherein the first computation is subject to safety constraints; and
 performing trajectory planning subject to the obtained vehicle crossing order at the MUTEX zones, to obtain a control signal for each of the vehicles,
 assigning a dependency metric to each pair of vehicles, and partitioning the vehicles into a number $N_{SG}$ of vehicle subsets such that the dependency metric exceeds a threshold $\eta$ within each,
 wherein the trajectory planning is performed as multiple independent subproblems, each relating to one of the vehicle subsets.

2. The method of claim 1, wherein the subproblems are solved as optimal control problems, OCPs, for a predefined cost function.

3. The method of claim 1, wherein the first computation is an optimization problem and the dependency metric is derived from the solving of said optimization problem.

4. The method of claim 3, wherein the dependency metric for a pair of vehicle paths is related to one or more dual optimization variables $\mu_k$ associated with safety constraints for the MUTEX zones between these vehicle paths.

5. The method of claim 3, further comprising:
 forming an adjacency matrix in which the elements correspond to pairs of the vehicles;
 reducing a nonzero element in the adjacency matrix if a safety constraint for a MUTEX zone between the paths of the corresponding vehicle has an associated dual optimization variable which is less than the threshold; and
 partitioning the vehicles into subsets in accordance with the adjacency matrix after the reductions.

6. The method of claim 1, wherein the dependency metric for a pair of vehicle paths is related to the number of MUTEX zones between these vehicle paths.

7. The method of claim 6, wherein the dependency metric is further related to a dependency importance weight.

8. The method of claim 7, wherein the dependency importance weight represents a time separation of consecutive vehicles at a MUTEX zone according to the crossing order.

9. The method of claim 1, wherein the partitioning of the vehicles includes:
 forming a weighted graph where nodes represent vehicles and where edges represent MUTEX zones; and
 performing a depth-first search to determine subgraphs.

10. The method of claim 1, further comprising determining the threshold based on the assigned values of the dependency metric.

11. The method of claim 1, wherein each of the subproblems is independent of the safety constraints of the first computation.

12. The method of claim 1, wherein the first computation is an optimization problem which is solved as a mixed-integer quadratic program, MIQP.

13. The method of claim 1, wherein the MUTEX zones include at least one of the following: an intersection zone, a merge-split zone, a dwelling zone, wherein the safety constraints for an intersection zone or a dwelling zone include a mutual exclusion requirement, and wherein the safety constraints for a merge-split zone include a minimum longitudinal spacing requirement.

14. The method of claim 1, wherein the common environment is a confined area with no other traffic participants than said vehicles.

15. The method of claim 1, wherein the movements of each vehicle are controllable independently of other vehicles.

16. A method of controlling a plurality of vehicles operating in a common environment which includes at least one MUTEX zone, wherein movements of each vehicle are controllable by a control signal, the method comprising:
 sensing current positions of all vehicles;
 performing trajectory planning according to the method of claim 1, subject to the sensed vehicle positions, to obtain a control signal for each of the vehicles; and
 feeding the control signals to the vehicles for execution.

17. The method of claim 16, wherein execution of the obtained control signals is subject to a successful verification of the safety constraints of the first computation.

18. The method of claim 17, further comprising, if the verification of the safety constraints of the first computation fails:
- partitioning the vehicles into a number $N_{SG}'$ of new vehicle subsets; and
- performing the trajectory planning as independent subproblems relating to the new vehicle subsets.

19. The method of claim 16, wherein the solving of the subproblems is delegated to one or more distributed processing resources, such as processing resources carried by the vehicles.

20. The method of claim 19, wherein the execution of the method, including any delegation, is coordinated by a central processing resource, which is either fixedly installed or carried by one of the vehicles.

21. A non-transitory computer-readable storage medium comprising instructions, which when executed by processing circuitry, cause the processing circuitry to perform the method of claim 1.

* * * * *